(12) United States Patent
Mangum

(10) Patent No.: US 10,396,540 B2
(45) Date of Patent: Aug. 27, 2019

(54) ELECTRIC SUBMERSIBLE PUMP POWER CABLE TERMINATION ASSEMBLY

(71) Applicant: Schlumberger Technology Corporation, Sugar Land, TX (US)

(72) Inventor: Jared Mangum, Richmond, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 84 days.

(21) Appl. No.: 15/301,907

(22) PCT Filed: Apr. 10, 2015

(86) PCT No.: PCT/US2015/025264
§ 371 (c)(1),
(2) Date: Oct. 4, 2016

(87) PCT Pub. No.: WO2015/157613
PCT Pub. Date: Oct. 15, 2015

(65) Prior Publication Data
US 2017/0187177 A1    Jun. 29, 2017

Related U.S. Application Data

(60) Provisional application No. 61/977,938, filed on Apr. 10, 2014.

(51) Int. Cl.
*E21B 43/12* (2006.01)
*H02G 15/02* (2006.01)
(Continued)

(52) U.S. Cl.
CPC ........... *H02G 15/02* (2013.01); *E21B 17/023* (2013.01); *E21B 17/028* (2013.01);
(Continued)

(58) Field of Classification Search
None
See application file for complete search history.

(56) References Cited

U.S. PATENT DOCUMENTS 2,233,890 A * 3/1941 Hoover ................. E21B 17/026
174/100
2,869,072 A * 1/1959 Gieske ................ E21B 47/0905
324/221
(Continued)

FOREIGN PATENT DOCUMENTS

WO    WO2011090531 A2    7/2011

OTHER PUBLICATIONS

Search Report and Written Opinion of International Patent Application No. PCT/US2015/025264 dated Aug. 3, 2015, 12 pages.
International Preliminary Report on Patentability of International Patent Application No. PCT/US2015/025264 dated Oct. 20, 2016, 11 pages.

*Primary Examiner* — D. Andrews

(57) ABSTRACT

A power cable termination assembly can include a cable end; a connector end; a longitudinal axis that extends between the cable end and the connector end; a cable securing mechanism; a dielectric material space that includes a volume where the dielectric material space is disposed axially at least in part between the cable securing mechanism and the connector end; and a movable component that moves responsive to a pressure differential where movement of the movable component alters the volume of the dielectric material space.

19 Claims, 16 Drawing Sheets

(51) Int. Cl.
    *F04D 13/10*     (2006.01)
    *H02K 5/22*     (2006.01)
    *F04D 13/06*     (2006.01)
    *E21B 17/02*     (2006.01)
    *H02G 15/007*     (2006.01)
    *H02G 15/013*     (2006.01)

(52) U.S. Cl.
    CPC ......... *F04D 13/0693* (2013.01); *F04D 13/10* (2013.01); *H02K 5/225* (2013.01); *E21B 43/128* (2013.01); *H02G 15/007* (2013.01); *H02G 15/013* (2013.01)

(56) References Cited

U.S. PATENT DOCUMENTS

| | | |
|---|---|---|
| 4,373,767 A | 2/1983 | Cairns |
| 5,772,457 A | 6/1998 | Cairns |
| 7,405,358 B2 | 7/2008 | Emerson |
| 2011/0155459 A1 | 6/2011 | Nicholson et al. |
| 2013/0312996 A1 | 11/2013 | Nicholson |
| 2014/0096992 A1* | 4/2014 | Williams ................ E21B 33/04 174/20 |
| 2014/0097001 A1* | 4/2014 | Campbell .......... H01R 13/5205 174/23 R |
| 2014/0190706 A1 | 7/2014 | Varkey et al. |
| 2014/0284050 A1* | 9/2014 | Jacob .................... E21B 47/011 166/250.01 |

\* cited by examiner

ELECTRIC SUBMERSIBLE PUMP POWER CABLE TERMINATION ASSEMBLY

RELATED APPLICATIONS

This application claims priority to and the benefit of a U.S. Provisional Application having Ser. No. 61/977,938, filed 10 Apr. 2014, which is incorporated by reference herein.

BACKGROUND

An electric submersible pump (ESP) can be supplied with power via one or more power cables. Such cables may contact fluid such as well fluid that is pumped by the ESP.

SUMMARY

A power cable termination assembly can include a cable end; a connector end; a longitudinal axis that extends between the cable end and the connector end; a cable securing mechanism; a dielectric material space that includes a volume where the dielectric material space is disposed axially at least in part between the cable securing mechanism and the connector end; and a movable component that moves responsive to a pressure differential where movement of the movable component alters the volume of the dielectric material space. A method can include operating an electric submersible pump system to pump fluid where the electric submersible pump system includes a power cable terminated by a power cable termination assembly; responsive to a change in a pressure differential between a dielectric material in the power cable termination assembly and the fluid being pumped, actuating a pressure compensation mechanism in the power cable termination assembly; and responsive to the actuating, reducing the pressure differential. A system can include a first power cable termination assembly; a second power cable termination assembly; a power cable operatively coupled to the first power cable termination assembly and to the second power cable termination assembly; and an electric submersible pump operatively coupled to the second power cable termination assembly where at least one of the first power cable termination assembly and the second power cable termination assembly includes a pressure compensation mechanism that includes a component that is movable where movement of the component alters volume of a dielectric material space in the at least one power cable termination assembly. Various other examples of equipment, techniques, etc. are described herein.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
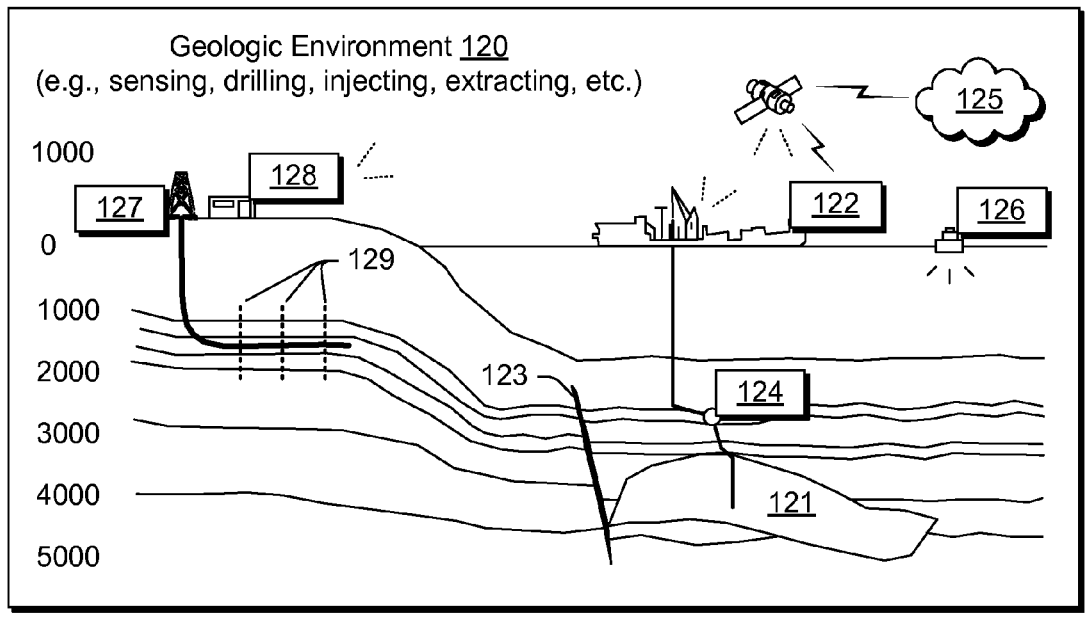
FIG. 1 illustrates examples of equipment in geologic environments.
Figure 1:
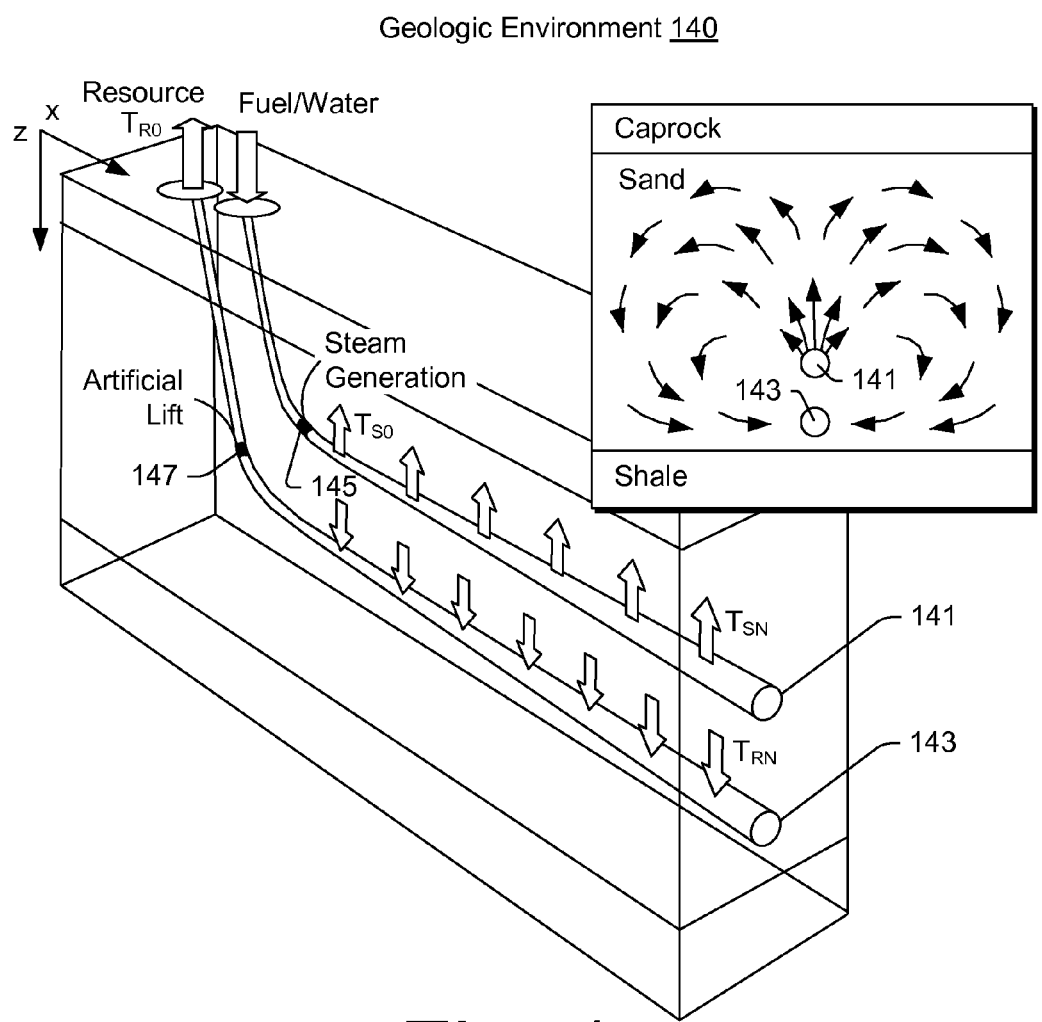

FIG. 1 shows examples of geologic environments 120 and 140. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, etc.

As to the geologic environment 140, as shown in FIG. 1, it includes two wells 141 and 143 (e.g., bores), which may be, for example, disposed at least partially in a layer such as a sand layer disposed between caprock and shale. As an example, the geologic environment 140 may be outfitted with equipment 145, which may be, for example, steam assisted gravity drainage (SAGD) equipment for injecting steam for enhancing extraction of a resource from a reservoir. SAGD is a technique that involves subterranean delivery of steam to enhance flow of heavy oil, bitumen, etc. SAGD can be applied for Enhanced Oil Recovery (EOR), which is also known as tertiary recovery because it changes properties of oil in situ.

As an example, a SAGD operation in the geologic environment 140 may use the well 141 for steam-injection and the well 143 for resource production. In such an example, the equipment 145 may be a downhole steam generator and the equipment 147 may be an electric submersible pump (e.g., an ESP).

As illustrated in a cross-sectional view of FIG. 1, steam injected via the well 141 may rise in a subterranean portion of the geologic environment and transfer heat to a desirable resource such as heavy oil. In turn, as the resource is heated, its viscosity decreases, allowing it to flow more readily to the well 143 (e.g., a resource production well). In such an example, equipment 147 (e.g., an ESP) may then assist with lifting the resource in the well 143 to, for example, a surface facility (e.g., via a wellhead, etc.). As an example, where a production well includes artificial lift equipment such as an ESP, operation of such equipment may be impacted by the presence of condensed steam (e.g., water in addition to a desired resource). In such an example, an ESP may experience conditions that may depend in part on operation of other equipment (e.g., steam injection, operation of another ESP, etc.).

In the example environment 140, a layer may include particulate material (e.g., solids). For example, consider a layer that includes sand that may be transported with fluid. Such particulate material may be carried by fluid, for example, as driven at least in part by operation of a pump. For example, the equipment 147 may come into contact with particulate material in fluid. As an example, the equipment 147 may include one or more mechanisms for handling fluid with particulate material.

Conditions in a geologic environment may be transient and/or persistent. Where equipment is placed within a geologic environment, longevity of the equipment can depend on characteristics of the environment and, for example, duration of use of the equipment as well as function of the equipment. Where equipment is to endure in an environment over a substantial period of time, uncertainty may arise in one or more factors that could impact integrity or expected lifetime of the equipment. As an example, where a period of time may be of the order of decades, equipment that is intended to last for such a period of time may be constructed to endure conditions imposed thereon, whether imposed by an environment or environments and/or one or more functions of the equipment itself.

Figure 2:
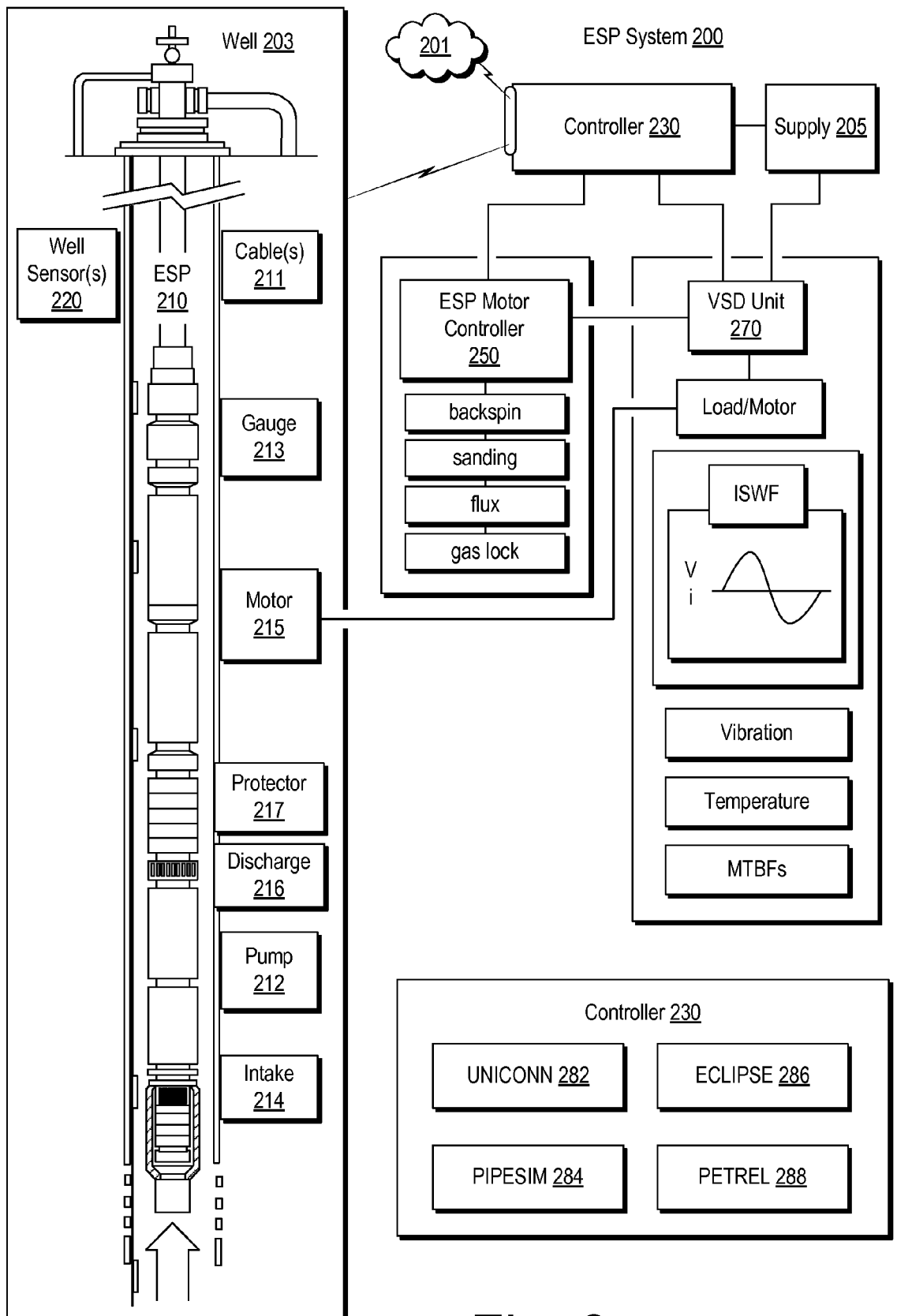
FIG. 2 illustrates an example of an electric submersible pump system.

FIG. 2 shows an example of an ESP system 200 that includes an ESP 210 as an example of equipment that may be placed in a geologic environment. As an example, an ESP may be expected to function in an environment over an extended period of time (e.g., optionally of the order of years). As an example, one or more commercially available ESPs (such as the REDA™ ESPs marketed by Schlumberger Limited, Houston, Tex.) may be employed in a geologic environment.

In the example of FIG. 2, the ESP system 200 includes a network 201, a well 203 disposed in a geologic environment (e.g., with surface equipment, etc.), a power supply 205, the ESP 210, a controller 230, a motor controller 250 and a VSD unit 270. The power supply 205 may receive power from a power grid, an onsite generator (e.g., natural gas driven turbine), or other source. The power supply 205 may supply a voltage, for example, of about 4.16 kV.

As shown, the well 203 includes a wellhead that can include a choke (e.g., a choke valve). For example, the well 203 can include a choke valve to control various operations such as to reduce pressure of a fluid from high pressure in a closed wellbore to atmospheric pressure. Adjustable choke valves can include valves constructed to resist wear due to high-velocity, solids-laden fluid flowing by restricting or sealing elements. A wellhead may include one or more sensors such as a temperature sensor, a pressure sensor, a solids sensor, etc.

As to the ESP 210, it is shown as including one or more cables 211, a pump 212, a gauge 213 (e.g., including one or more sensors), a pump intake 214, a motor 215, a pump discharge 216 and optionally a protector 217. As an example, the ESP 210 may be a cable deployed ESP, for example, where a power cable carries at least a portion of the weight of the ESP 210. As an example, during deployment, a power cable may carry the weight of an ESP as it is positioned in a bore in a geologic environment, retrieved from a bore in a geologic environment, etc.

As an example, an ESP motor may be a multiphase motor. For example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation.

In the example of FIG. 2, the well 203 may include one or more well sensors 220. For example, such sensors may include one or more fiber-optic based sensors that can provide for real time sensing of temperature, for example, in SAGD or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP.

In the example of FIG. 2, the controller 230 can include one or more interfaces, for example, for receipt, transmission or receipt and transmission of information with the motor controller 250, a VSD unit 270, the power supply 205 (e.g., a gas fueled turbine generator, a power company, etc.), the network 201, equipment in the well 203, equipment in another well, etc.

As shown in FIG. 2, the controller 230 may include or provide access to one or more modules or frameworks. Further, the controller 230 may include features of an ESP motor controller and optionally supplant the ESP motor controller 250. For example, the controller 230 may include the UNICONN™ motor controller 282 marketed by Schlumberger Limited (Houston, Tex.). In the example of FIG. 2, the controller 230 may access one or more of the PIPESIM™ framework 284, the ECLIPSE™ framework 286 marketed by Schlumberger Limited (Houston, Tex.) and the PETREL™ framework 288 marketed by Schlumberger Limited (Houston, Tex.) (e.g., and optionally the OCEAN™ framework marketed by Schlumberger Limited (Houston, Tex.)).

In the example of FIG. 2, the motor controller 250 may be a commercially available motor controller such as the UNICONN™ motor controller. The UNICONN™ motor controller can perform some control and data acquisition tasks for ESPs, surface pumps or other monitored wells. The UNICONN™ motor controller can interface with fixed speed drive (FSD) controllers or a VSD unit, for example, such as the VSD unit 270.

For FSD controllers, the UNICONN™ motor controller can monitor ESP system three-phase currents, three-phase surface voltage, supply voltage and frequency, ESP spinning frequency and leg ground, power factor and motor load.

For VSD units, the UNICONN™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

In the example of FIG. 2, the ESP motor controller 250 includes various modules to handle, for example, backspin of an ESP, sanding of an ESP, flux of an ESP and gas lock of an ESP. The motor controller 250 may include any of a variety of features, additionally, alternatively, etc.

In the example of FIG. 2, the VSD unit 270 may be a low voltage drive (LVD) unit, a medium voltage drive (MVD) unit or other type of unit (e.g., a high voltage drive, which may provide a voltage in excess of about 4.16 kV). As an example, the VSD unit 270 may receive power with a voltage of about 4.16 kV and control a motor as a load with a voltage from about 0 V to about 4.16 kV. The VSD unit 270 may include commercially available control circuitry such as the SPEEDSTAR™ MVD control circuitry marketed by Schlumberger Limited (Houston, Tex.).

As an example, a power cable may be used to power an ESP and terminated with penetrators that act to withstand well head casing pressures. As an example, where a power cable is used to position an ESP, the power cable can be exposed to production fluid along with system weight, pressure and temperature. At a highest level in an operation, an upper cable termination may be functionally responsible for supporting an entire tool string load, providing safe means for an electrical connection to a surface power source, protecting electrical conductors from wellbore environment as they exit the power cable and providing barrier control between the power cable and surface electrical connections.

A power cable tends to be non-homogeneous and to have a lower modulus (cumulatively) than that of steel, for example, posing some challenges in sealing against an outer surface of the cable. A high differential across ends of a power cable may cause, for example, one or more polymeric materials to flow (e.g., creep, etc.) and deform. As an example, a power cable may include voids where, for example, if the power cable is breached, these voids may act as conduits that can allow fluid and gas to migrate (e.g., to terminations, etc.).

As an example, to mitigate various phenomena associated with power cable contact with fluid, a power cable termination assembly may include a pressure compensation mechanism. For example, a pressure compensation mechanism may act in response to a pressure differential to balance pressure in a space, a chamber, a network, etc. within the power cable termination assembly.

As an example, a power cable termination assembly may allow for assembly "post rope socket". For example, a power cable may be fit to a rope socket and, thereafter, fit into a power cable termination assembly; noting that the rope socket may be part of the power cable termination assembly. For example, a power cable termination assembly may allow a termination to be assembled after the rope socket has passed through an injector head (e.g., used for deployment of the power cable) or, for example, disassembled prior to passing through the injector head during a pull operation. Such an approach may save an operator time and costs in that the power cable does not have to be cut and re-terminated with a new rope socket in order to pass through the injector head.

As an example, due to rig costs, rigless deployment may be employed for an electric submersible pump (ESP) where such deployment includes, at least in part, suspending the ESP via a power cable. For example, power cable-based deployment of an ESP may be performed without a conventional rig, which may help to reduce down time. As an example, an ESP may be deployed via a power cable in an off shore environment and/or a land environment.

Figure 3:
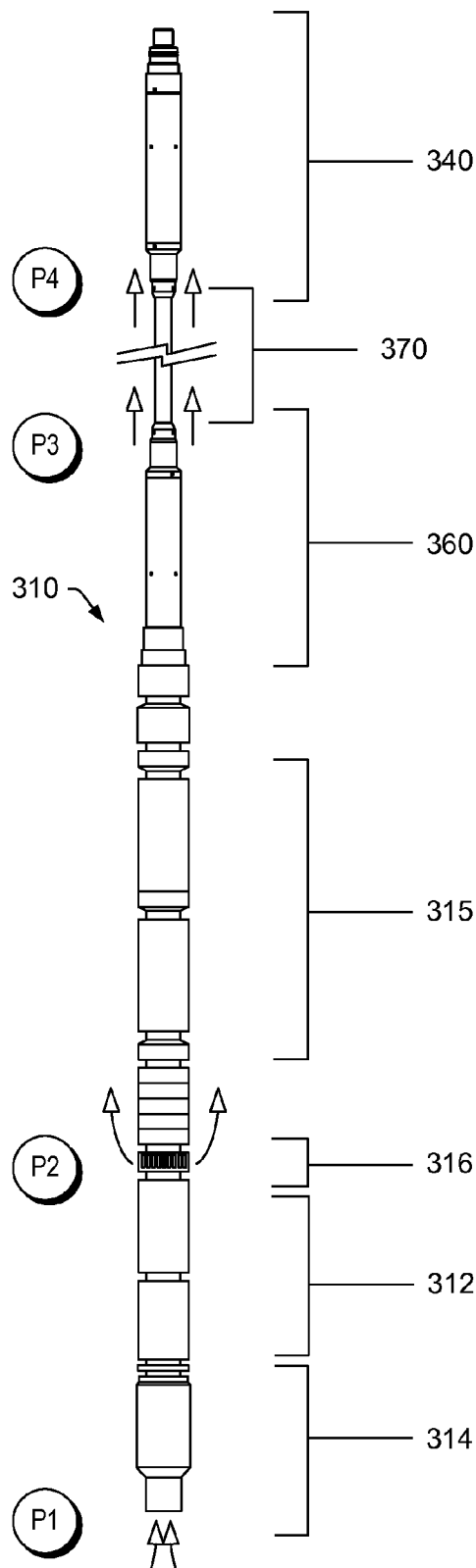
FIG. 3 illustrates an example of a system and an example of a method.
Figure 3:
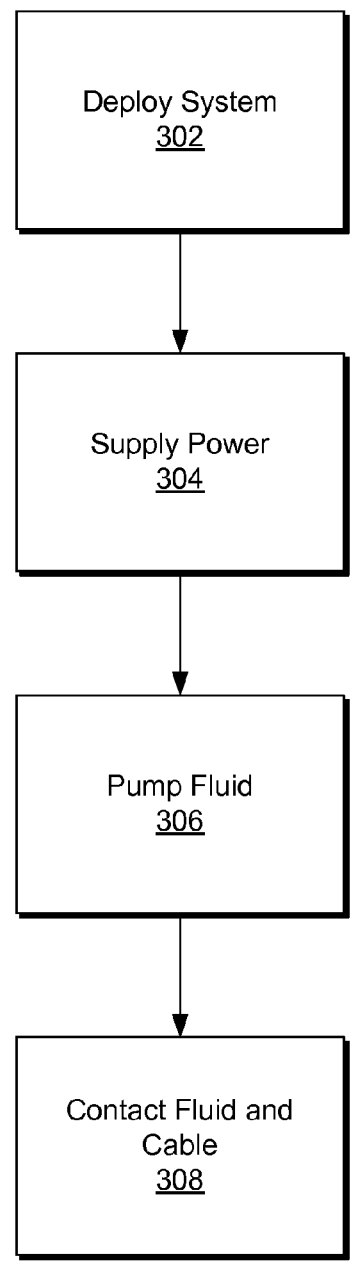

FIG. 3 shows an example of a system 300 and an example of a method 301. The system 300 includes an electric submersible pump (ESP) 310 that can include various features of the ESP 210 of FIG. 2. For example, the ESP 310 includes a pump 312, a pump intake 314, a pump motor 315 and a pump discharge 316. The system 300 also includes an uphole pressure compensated termination assembly 340 and a downhole pressure compensated termination assembly 360 as well as a cable 370 (e.g., or cables). As shown in the example of FIG. 3, the downhole pressure compensated termination assembly 360 is operatively coupled to the ESP 310 to operatively couple the cable 370 to the ESP 310, for support and/or for delivery of power (e.g., depending on operational phase, etc.).

As shown in FIG. 3, the method 301 includes a deployment block 302 for deployment of the system 300, a supply block 304 for supplying power to the system 300, a pump block 306 for pumping fluid with the system 300 and a contact block 308 for contacting fluid and the cable 370. Such fluid/cable contact can occur in the uphole pressure compensated termination assembly 340 and/or in the downhole pressure compensated termination assembly 360.

The deployment block 302 can include deploying the ESP 310 via the cable 370 where the cable 370 is operatively coupled the ESP 310. For example, the ESP 310 may be a cable deployed ESP. In such an example, equipment at a surface location can include a mechanized reel that can carry at least a portion of the cable 370 and that can be rotatably driven to reel-out and/or reel-in the cable 370, for example, to position the ESP 310 (e.g., in a bore).

As an example, the pump block 306 can include pumping fluid from a downhole environment to an uphole environment. For example, the supply block 304 can supply power via the cable 700 to the electric motor 315 to rotatably drive a shaft (e.g., or reciprocate a shaft) that is operatively coupled to the pump 312. In such an example, fluid can enter the pump intake 314, be moved by the pump 312 and be discharged via the pump discharge 316. During operation of the pump 312, pressures may be altered at one or more locations, as indicated by pressures P1, P2, P3 and P4.

As shown, P1 corresponds to an intake pressure, P2 corresponds to a discharge pressure, P3 corresponds to a pressure at the downhole pressure compensated termination assembly 360 and P4 corresponds to a pressure at the uphole pressure compensated termination assembly 340. As an example, the uphole and/or the downhole pressure compensated termination assemblies can respond to changes in pressure (e.g., pressure of fluid in a bore).

Figure 4:
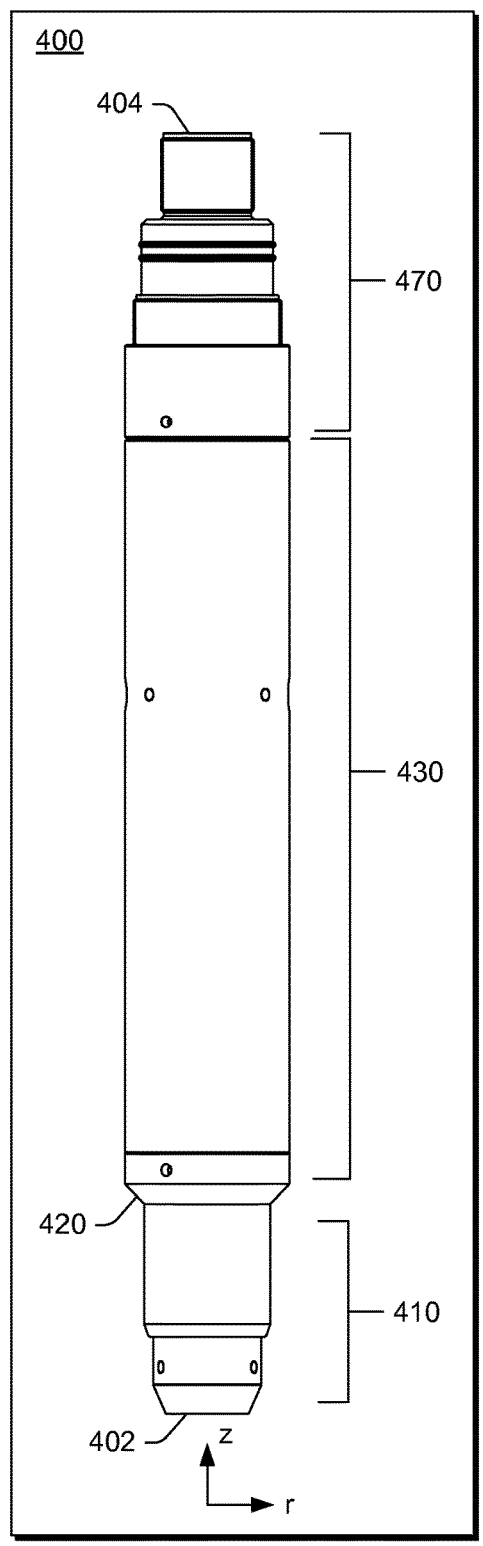
FIG. 4 illustrates an example of a power cable termination assembly.

FIG. 4 shows an example of the pressure compensated termination assembly 400, which includes a cable end 402, a connector end 404, a cable receipt sub-assembly 410 that includes a shoulder component 420, a cable securing sub-assembly 430 and an electrical connector sub-assembly 470. Various features of the pressure compensated termination assembly 400 may be defined, at least in part, with respect to a cylindrical coordinate system (e.g., r, z, Θ).

Figure 5:
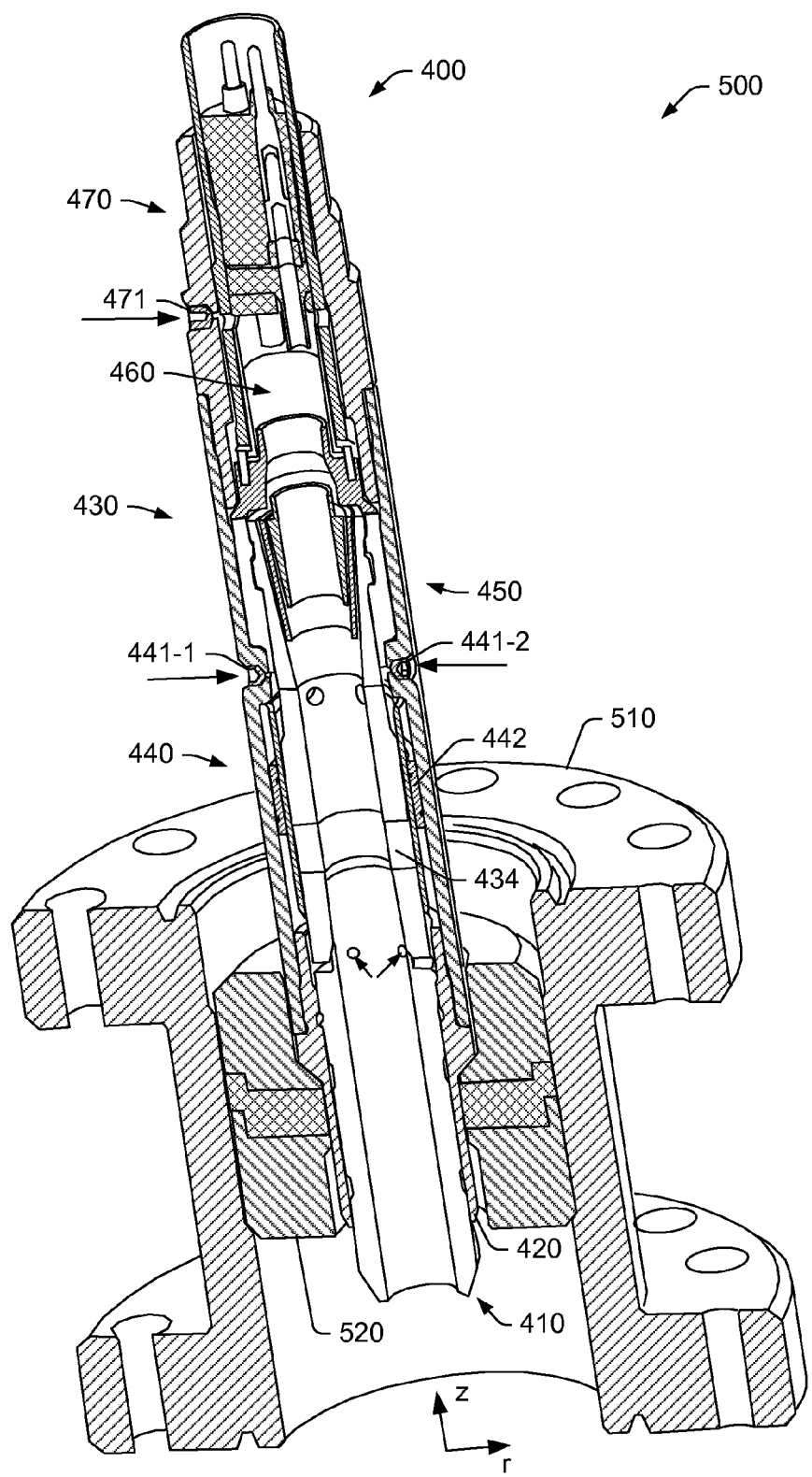
FIG. 5 illustrates an example of a system.

FIG. 5 shows an example of a system 500 that includes the pressure compensated termination assembly 400 as received by a hanger assembly that includes a spool 510 and hanger components 520. As shown, the shoulder component 420 is seated by a receptacle formed by one or more of the hanger components 520 that is seated within a bore of the spool 510. The spool 510 may be mechanically coupled to a component or components such that the pressure compensated termination assembly 400 carries the weight of a cable and an ESP that is operatively coupled to the cable. For example, the cable 370 and the ESP 310 of FIG. 3 may be suspended in a bore via a hanger assembly (e.g., optionally along with another pressure compensated termination assembly 360).

In the example of FIG. 5, the pressure compensated termination assembly 400 is shown as including a seal mechanism 434, a pressure compensation mechanism 440 that includes an annular piston 442 as a movable component, a securing mechanism 450 and a dielectric material space 460 that may include a dielectric material chamber and a dielectric material network that is in fluid communication with the dielectric material chamber. For example, such a chamber may be disposed axially between a securing mechanism and a connector end of a pressure compensated termination assembly.

As an example, a dielectric material may be fluid such as a liquid or a flowable or semi-flowable gel. As an example, a gel may be a cushioning gel and may optionally be self-healing. As an example, a gel may provide for stress relief and self-healing qualities of a liquid while providing the dimensional stability of an elastomer. Dielectric material may include thermal properties such that the dielectric material changes density with respect to temperature (e.g., over a range of temperatures). In such an example, the dielectric material may expand and contract. As an example, a pressure compensation mechanism may respond to expansion and/or contraction of dielectric material. For example, where volume of dielectric material decreases, a pressure compensation mechanism may act to decrease volume of a dielectric material space (e.g., a piston may translate to decrease volume of such a space) and, where volume of dielectric material increases, a pressure compensation mechanism may act to increase volume of a dielectric material space (e.g., a piston may translate to increase volume of such a space).

Sealable ports 441-1, 441-2 and 471 are also illustrated in the example of FIG. 5 where the ports 441-1, 441-2 and 471 are in fluid communication with the dielectric material space 460. Such ports may be used to introduce dielectric fluid into a dielectric material chamber and a dielectric material network. As an example, one or more ports may be used as one or more inlet ports and one or more ports may be used as one or more outlet ports (e.g., to allow for escape of gas while filling). As an example, one or more ports may be used to apply a vacuum that can be used to draw dielectric material into a chamber, a network, etc. In such an example, a pressure compensation mechanism may optionally include an elastic element such as a spring that may bias a movable component such as a piston such that the piston is limited in its motion and position where a vacuum is applied.

As shown in FIG. 5, the dielectric material space 460 serves as a space where electrical connections may be made between electrical conductors of a cable and electrical connectors of the electrical connector sub-assembly 470. For example, electrical conductors of a cable may be terminated at electrical connectors, which are shown in the example of FIG. 5 as male plugs. Where a cable is a three-phase cable with three electrical conductors, an electrical connector sub-assembly can include three male plugs. As an example, an electrical connector sub-assembly may include female receptacles. As an example, an electrical connector sub-assembly may include a combination of types of electrical plugs, receptacles, etc.

As an example, electrical conductors of a cable may be electrically connected to other conductors within and/or adjacent to a dielectric material chamber such as a dielectric material chamber of the dielectric material space 460. A dielectric material may act to insulate conductors within a dielectric material chamber (e.g., and to further insulate where the conductors include one or more of their own respective insulation layers). Where pressure external to a dielectric material space changes, such external pressure may have an effect on dielectric material, components that define a dielectric material space, fluid material that may intrude a dielectric material space, fluid material that may intrude a dielectric material network that is in fluid communication with a dielectric material chamber, etc.

In the example of FIG. 5, the dielectric material space 460 includes a network of passages that extend axially to a space that extends to one end of the annular piston 442. Axially at the other end of the annular piston 442 is a space that can be affected by a pressure of fluid such as well fluid. As an example, such a space may be occupied by well fluid. Thus, for example, one end of the annular piston 442 can be exposed to dielectric material and the other end of the annular piston can be exposed to well fluid. Where a pressure change occurs, the annular piston 442 may translate and thereby act to "balance" pressure on one end with pressure on another end. Such translation can reduce or increase volume of a dielectric material space such as the dielectric material space 460.

As an example, a pressure compensation mechanism may optionally be configured to act in part as a dashpot. For example, a pressure compensation mechanism may act as a damper that resists motion via viscous friction that can slow motion and absorb energy.

As an example, a pressure compensation mechanism may optionally include an elastic element such as a spring (e.g., or springs). As an example, a pressure compensation mechanism may include a spring that applies a biasing force to a piston (e.g., consider the annular piston 442), which may act to resist axial displacement of the annular piston where an increase in pressure of well fluid occurs.

As an example, a pressure compensation mechanism may optionally be configured to act as a dashpot that is biased by an elastic element or elastic elements (e.g., one or more springs, etc.).

As an example, a pressure compensation mechanism may be, or include, one or more bellows. As an example, a bellows may define a space (e.g., by at least one bellows wall). In such an example, the space may be a fluid space where axial lengthening and axial shortening of the bellows causes the volume of the fluid space to change. As an example, a bellows may be a movable component, for example, where a portion of the bellows can translate with respect to ends of the bellows (e.g., consider a multiple diameter bellows). As an example, a bellows may be a movable component, for example, where an end of the bellows can translate with respect to another end of the bellows.

As an example, a power cable termination assembly can include a cable end; a connector end; a longitudinal axis that extends between the cable end and the connector end; a cable securing mechanism (see, e.g., the cable securing mechanism 450); a dielectric material space (see, e.g., the dielectric material space 460) that includes a volume where the dielectric material space is disposed axially at least in part between the cable securing mechanism and the connector end; and a movable component (see, e.g., the annular piston 442) that moves responsive to a pressure differential where movement of the movable component alters the volume of the dielectric material space.

Figure 6:
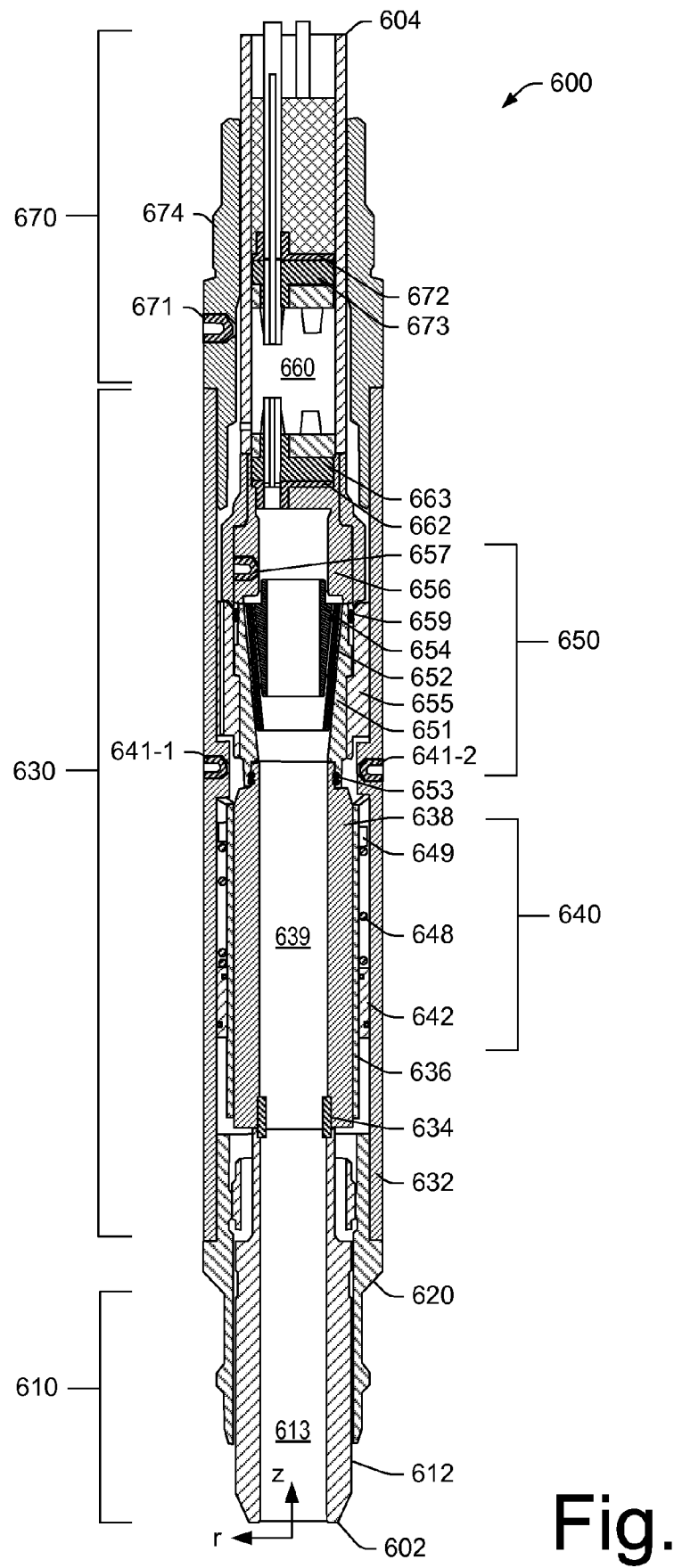
FIG. 6 illustrates an example of a power cable termination assembly.

FIG. 6 shows an example of a pressure compensated termination assembly 600, which includes various features as identified in the example of FIG. 4. For example, in FIG. 6, the assembly includes a cable end 602, a connector end 604, a cable receipt sub-assembly 610 that includes a shoulder component 620, a cable securing sub-assembly 630 and an electrical connector sub-assembly 670. The assembly 600 also includes a seal mechanism 634, a pressure compensation mechanism 640 that includes an annular piston 642, a securing mechanism 650 and a dielectric material space 660 as well as various ports, including ports 641-1 and 641-2 of a housing 632 and port 671 of a connector housing 674.

As an example, a cable can be terminated by the securing mechanism 650 of the assembly 600, which may be a load bearing rope socket. For example, an end of a cable may be received at the cable end 602 via a sleeve 612 that forms a bore 613 into which the cable may be positioned. The cable can also extend into a bore 639 formed by a spacer 638 where the cable may be partially disassembled, for example, such that strands of the cable are secured between rope socket components 651, 652 and 654. Conductors of the cable can extend axially to the portion of the dielectric material space 660 that may be defined in part by boot components. In the example of FIG. 6, electrical connections may be made between conductors of a cable and conductors of the electrical connector sub-assembly 670.

As an example, the assembly 600 can include various seal elements that can form seals with respect to an outer surface of a cable. For example, the seal mechanism 634 may be, or include, a packer type of seal element that can be positioned around an outer surface of a cable and, for example, energized by one or more elements (e.g., one or more springs, pusher elements, etc.). As an example, a cable may include an elastomeric outer layer where energizing of one or more elements can form a seal with respect to the outer surface of the cable and the spacer 638 (e.g., an inner surface of the spacer 638 that forms the bore 639).

As an example, an assembly process can include introducing potting material, for example, to pot components between the seal mechanism 634 and cable boot seals 662 and 663 (e.g., through which conductors of the cable pass). In such an example, the seal mechanism 634 and the boot seals 662 and 663 may define an axial length that may be considered to be a "potted" length of the assembly 600. For example, a potting process can form a potted section of the pressure compensated termination assembly 600 where the potted section may be effectively isolated from the rest of the assembly 600, for example, via a potting housing 656, the rope socket components 651, 652 and 654, the spacer 638, the seal mechanism 634, one or more potting material ports 657, and one or more seal elements 653 and 659 (e.g., O-ring seals and backups).

As shown in the example of FIG. 6, the potting housing 656 includes the port 657, which may be utilized to introduce potting material after a cable is secured via the securing mechanism 650. For example, a cable may include strands that can be separated and disposed between the rope socket components 651, 652 and 654 (e.g., conical shaped nesting components), which are seated by the rope socket component 651, which is seated by a rope socket housing 655.

As an example, a potting material (e.g., a potting compound) can provide a substantially solid backing for the cable seals 662 and 663 to react against; fill an anti-extrusion gap between the cable and the seal mechanism 634 (e.g., a backup ring, elastomers, chevrons, etc.); fill voids in the potted section of the assembly 600, which, in turn, can act to prohibit extrusion of cable polymeric material into a potted area; and encapsulate polymeric material that surrounds conductors (e.g., consider ethylene propylene diene monomer (M-class) rubber (EPDM) as a polymeric material) where the conductors exit the rope socket components 651, 652 and 654, which may act to prevent swelling of polymeric material and, for example, damage caused by heat and fluid ingress.

As an example, after introduction of potting material, an assembly process can include introducing dielectric material. For example, one or more of the ports 641-1, 641-2 and 671 may be utilized to introduce dielectric material that can fill, at last in part, the dielectric material space 660. Such a dielectric material may be referred to as a dialectic compensating fluid (e.g., consider a liquid or a gel).

As mentioned, where the assembly 600 is exposed to produced fluid (e.g., well fluid), pressure may be transmitted to the compensating fluid (e.g., the dielectric material) via the annular piston 642. In such an example, via the pressure compensation mechanism 640, produced fluid is less likely to enter the electrical conductor termination zone due to differential pressure balancing (e.g., which may act to achieve a differential pressure of approximately 0 or within a particular operative pressure range of the annular piston 642). As an example, where a cable is breached and fluid transmitted up the cable, its progress can be stopped or delayed due to the lack of a differential pressure (e.g., as a driving force).

In the example of FIG. 6, the pressure compensation mechanism 640 includes the annular piston 642 and a spring 648, which are disposed in an annular space that is defined at least in part via an outer surface of a component 636 and an inner surface of the housing 632. As shown, the spring 648 may be axially located at a fixed end via a stop 649. The annular piston 642 may include one or more annular grooves, for example, that can each receive one or more seal elements. In such an example, one or more seal elements may form a seal with respect to the outer surface of the component 636 and one or more seal elements may form a seal with respect to the inner surface of the housing 632. Such seals can act to isolate dielectric material from well fluid.

As an example, where pressure is greater at a well fluid end of the annular piston 642 compared to pressure at a dielectric material end of the annular piston 642, the annular piston 642 can translate axially toward the dielectric material chamber of the dielectric material space 660 in a manner that acts to decrease the volume of a dielectric network of the dielectric material space 660 where the dielectric material network is in fluid communication with the dielectric material chamber (e.g., region disposed at least in part between boot components). Characteristics of such translation may be affected by one or more characteristics of the spring 648. For example, a stiffer spring (e.g., as characterized by spring constant) will resist movement and act to damp sudden changes in pressure when compared to a spring that is less stiff. Further, a fluid passage (or fluid passages) may be dimensioned to "restrict" fluid flow (e.g., flow of dielectric material) and thereby act to viscously damp sudden changes in pressure.

As an example, various components of a pressure compensated termination assembly may be clamshell components, for example, being of a split design. For example, various components in the assembly 400 of FIG. 5 are illustrated with surfaces that are not hatched, which may correspond to "split" components. For example, a rope socket housing (see, e.g., the rope socket housing 655), and a sleeve (see, e.g., the sleeve 612) can be of a split design, which allows them to be assembled post rope socket (e.g., after strands of a cable have been disposed between the components 652 and 654). As an example, various components such as, for example, the shoulder components 420 and 620, the component 636, the annular pistons 442 and 642 and the housing 632 may be shaped and sized to slide over the rope socket 651.

As an example, a method can include securing strands of a power cable between rope socket components and then securing the rope socket components within a rope socket housing that is a clamshell type of housing (e.g., a two piece housing). As an example, a method can include securing strands of a power cable between two rope socket components and then securing additional strands of the power cable between one of the rope socket components and a clamshell rope socket component. As an example, a rope socket sub-assembly that secures a cable may be translated into a housing. For example, consider the securing mechanism 450 of FIG. 5, which may include a cable, be "clamshelled" and then translated downwardly to be seated in a housing. Then the appropriate electrical conductor terminations may be made and the electrical connector sub-assembly 470 fit to the housing. As an example, one or more housing pieces may be threaded such that they may be operatively coupled during an assembly process.

As an example, a power cable termination assembly can include a cable end; a connector end; a longitudinal axis that extends between the cable end and the connector end; a cable securing mechanism (see, e.g., the cable securing mechanism 650); a dielectric material space (see, e.g., the dielectric material space 660) that includes a volume where the dielectric material space is disposed axially at least in part between the cable securing mechanism and the connector end; and a movable component (see, e.g., the movable component 642) that moves responsive to a pressure differential where movement of the movable component alters the volume of the dielectric material space.

Figure 7:
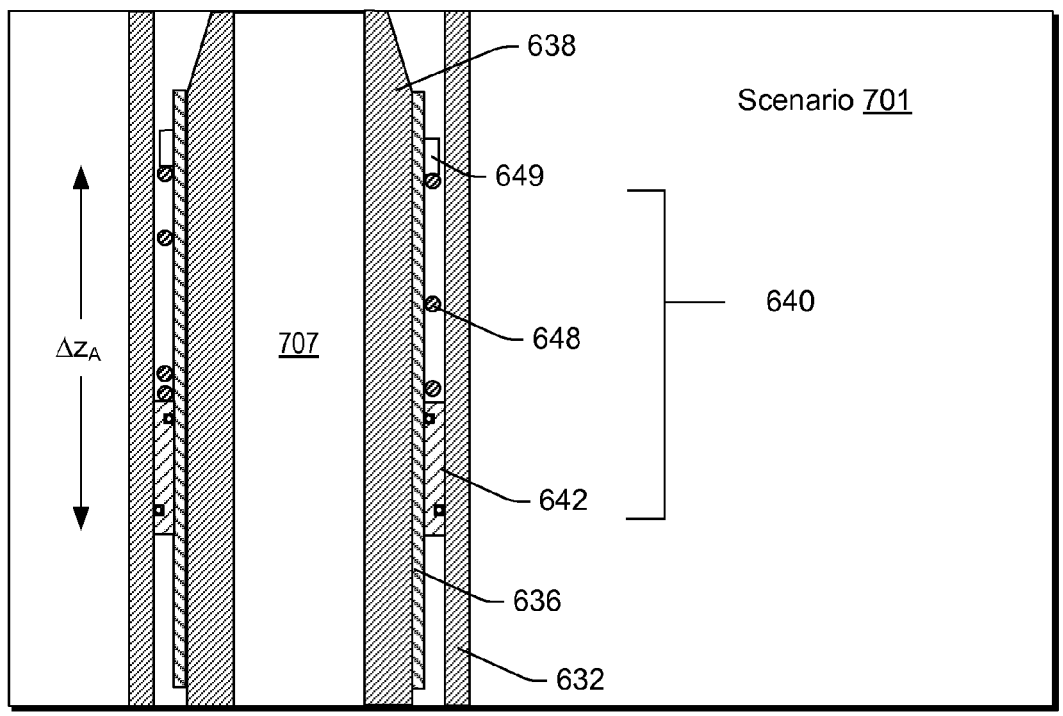
FIG. 7 illustrates examples of scenarios.
Figure 7:
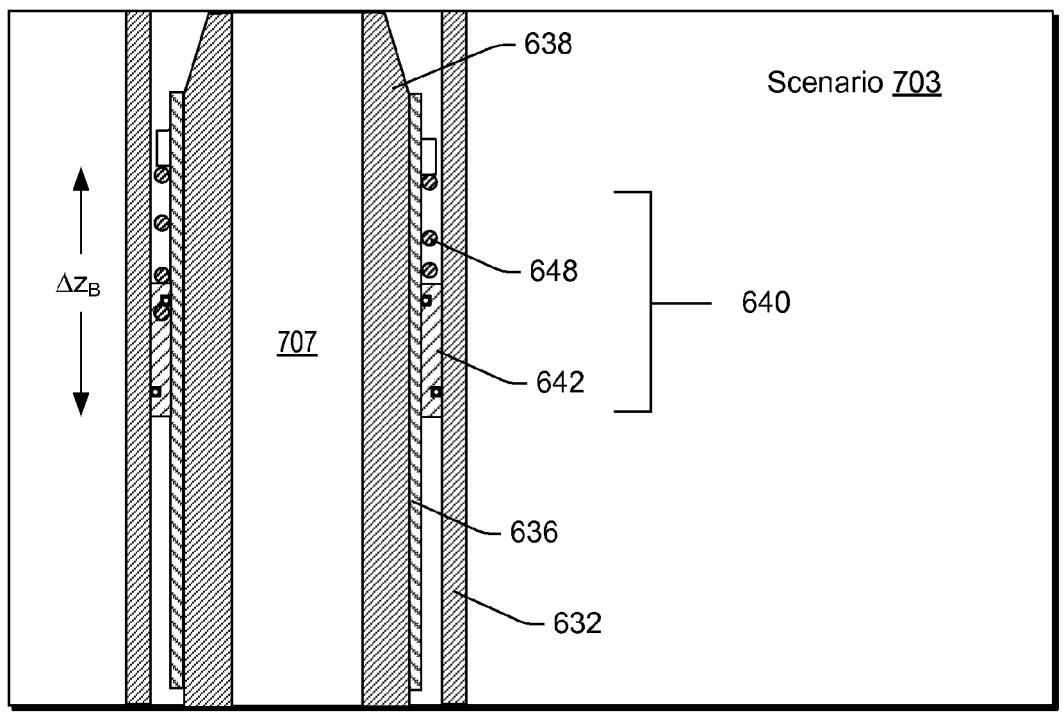

FIG. 7 shows an example scenario 701 and an example scenario 703 along with a portion of the assembly 600 of FIG. 6 with a cable 707. As shown, in the scenario 701, an axial distance $\Delta z_A$ exists between an end of the annular piston 642 and an end of the spring 648; whereas, in the scenario 703, a different axial distance $\Delta z_B$ exists between an end of the annular piston 642 and an end of the spring 648.

Figure 8:
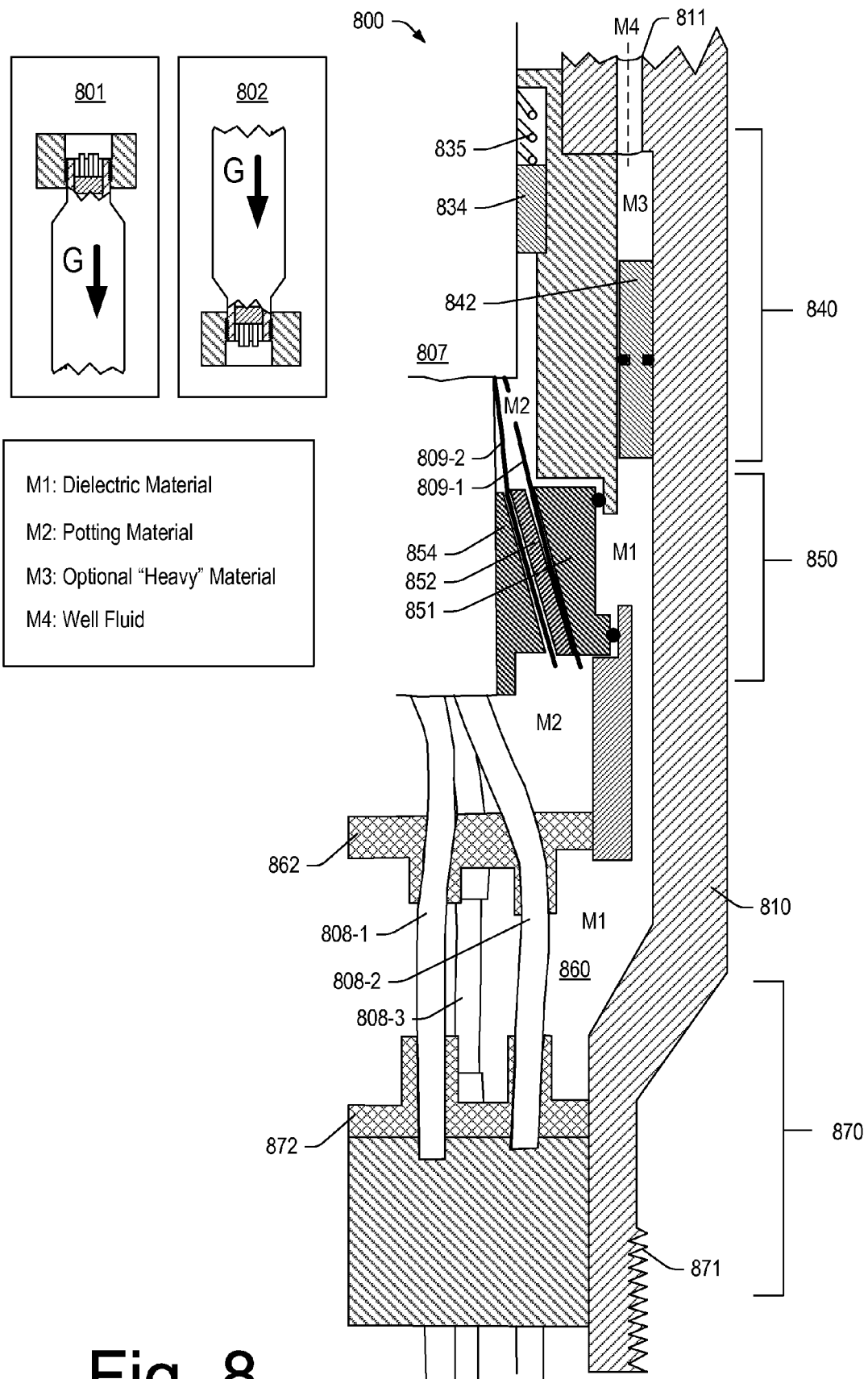
FIG. 8 illustrates an example of a portion of a power cable termination assembly.

FIG. 8 shows a portion of an example of an assembly 800, which may be, for example, oriented in a first orientation 801 with respect to gravity or in a second orientation 802 with respect to gravity; noting that the assembly 800 may optionally be oriented at an angle with respect to gravity. As shown, the assembly 800 includes a pressure compensation mechanism 840, a securing mechanism 850, a dielectric material space 860 and an electrical connector sub-assembly 870.

As shown in FIG. 8, the assembly 800 may include various materials such as, for example, dielectric material (M1), potting material (M2), and optionally high specific gravity material (M3). The assembly 800 may be in contact with fluid such as well fluid (M4). Well fluid (M4) may enter the assembly 800 or otherwise interact with the assembly 800 such that the pressure compensation mechanism 840 may act to balance one or more internal pressures with an external pressure (e.g., pressure of the well fluid (M4)).

Also shown in FIG. 8 is a portion of a power cable 807 that includes conductors 808-1, 808-2 and 808-3, which can be insulated conductors. As an example, the power cable 807 may be suitable for delivery of power to a multiphase electric motor via a plurality of conductors. As to strength (e.g., to support an ESP, weight of the cable, etc.), the power cable 807 can include strands 809-1 and 809-2, which may be armor strands that are wound about a core of the power cable where the conductors 808-1, 808-2 and 808-3 are disposed within the core. In the example of FIG. 8, the strands 809-1 and 809-2 may be a first set of strands and a second set of strands. During assembly, these strands may be separated and pulled away from the core of the power cable 807 and secured via the securing mechanism 850, which may be, for example, a rope socket that includes rope socket components 851, 852 and 854. In the example of FIG. 8, potting material (M2) may be included to pot axial ends of at least one or more of the components 851, 852 and 854 with the strands 809-1 and 809-2 secured thereby.

As an example, the securing mechanism 850 (see, e.g., the component 851) may be sealed via one or more seal elements or otherwise separated from (e.g., via one or more barriers, components, etc.) the dielectric material space 860 (see, e.g., regions labeled dielectric material (M1)). The potting material (M2) may perform various functions and the dielectric material (M1) may perform various functions. The potting material (M2) may be substantially solid (e.g., a hard material), for example, achieved via setting and/or curing of a base or base materials (e.g., epoxy mix, polymerizable material, etc.). The dielectric material (M1) may optionally be in a gel state, which may, for example, expand and/or contract in response to changes in temperature. As an example, consider dielectric material that includes silicone. As an example, dielectric material may be formed of base materials that are combined (e.g., mixed, etc.). As an example, a dielectric strength of a dielectric material may be of the order of about ten or more kV per mm (e.g., of the order of about hundreds of volts per mil).

In the example of FIG. 8, the assembly 800 includes a housing 810, which may be a multi-piece housing. The housing 810 may include threads 871 such that, for example, the housing 810 can be received by a threaded receptacle of a hanger assembly. In such an example, the assembly 800 may extend downwardly from the hanger assembly and be in contact with fluid such as, for example, well fluid (M4). While threads are mentioned, a connection mechanism may include threads or other types of features to connect components (e.g., bayonet, etc.). As an example, a power cable termination assembly may be operatively coupled to an end of an electric submersible pump to power at least one electric motor of the electric submersible pump.

As an example, the housing 810 can include a port 811 through which external pressure may be communicated. As an example, the port 811 may be open to well fluid (M4). As an example, a power cable termination assembly may include a port through which external pressure may be communicated and/or may include one or more clearances through which external pressure may be communicated. For example, a seal may be formed prior to deployment of a power cable termination assembly where such a seal may be subject to leakage and intrusion of well fluid. As an example, a well fluid may be a single phase fluid or a multiphase fluid. As an example, a well fluid may be a gas. As an example, a well fluid may be a liquid. As an example, a power cable termination assembly may include one or more elastomeric seal elements that can form one or more elastomeric seals and/or may include one or more metal seal elements (e.g., alloy seal elements) that can form one or more metal-to-metal seals.

As an example, a power cable termination assembly may be exposed to one or more types of environments, which may change over time (e.g., including changes due in part to operation of one or more pumps, etc.). Such exposure may result in leakage, intrusion, further leakage, further intrusion, etc. of well fluid into the power cable termination assembly. Where a pressure compensation mechanism acts to reduce a pressure differential that may be a driving force for movement of material (e.g., fluid, gel, etc.), the pressure compensation mechanism may act to reduce leakage, intrusion, etc. of well fluid, particularly to portions of a power cable termination assembly where individually separated conductors may reside.

As shown in FIG. 8, the housing 810 houses a boot with boot components 862 and 872 that can define in part the dielectric material space 860. The housing 810 also houses a seal element 834 that is biased by a biasing mechanism 835 (e.g., a spring, etc.), a movable component 842 (e.g., an annular piston) and the rope socket components 851, 852 and 854 of the securing mechanism 850 where, as mentioned, the rope socket components 851, 852 and 854 can secure strands 809-1 and 809-2 of the cable 807 (e.g., armor wire strands). For example, the strands 809-1 may be received between the components 851 and 852 and the strands 809-2 may be received between the components 852 and 854. As mentioned, a cable received in the housing 810 may be potted using a potting material (M2). For example, potting material (M2) can be disposed at least in part in spaces axially above and below the rope socket components 851, 852 and 854.

In an assembly, potting material may perform one or more functions. As an example, potting material may act to protect insulation of a cable, which can include insulation of individually insulated conductors (see, e.g., the conductors 808-1, 808-2 and 808-3). As an example, potting material may provide support (e.g., backing, etc.) for a boot component (e.g., consider the boot component 862). As an example, potting material may encapsulate one or more portions of a cable or component(s) of a cable such that swelling is reduced. As an example, potting material can fill a space about a cable or cable components such that swelling and/or extrusion of one or more cable materials is restricted (e.g., constrained) and such potting material may reduce risk of damage to a cable or cable components. As an example, potting material may reduce risk of swelling of one or more cable components (e.g., insulated conductors), encapsulate one or more cable components (e.g., portions of one or more insulated conductors) and physically protect one or more cable components.

As an example, where a cable may be constructed of one or more flowable materials (e.g., polymeric materials, etc.), potting material may act to reduce risk of flow (e.g., via an extrusion type of flow, creep, etc.). For example, where the seal element 834 applies a force to a cable, the potting material (M2) may reduce risk of flow of flowable material of the cable (e.g., from flowing toward the rope socket components 851, 852 and 854). In other words, if a space between the cable and the rope socket components 851, 852 and 854 were filled with a compressible gas, force applied to the cable by the seal mechanism 834 may cause one or more polymeric materials to flow toward the space as the compressible gas may provide insufficient resistance to such flow. As to the biasing mechanism 835, it can bias the seal element 834. For example, the biasing mechanism 835 can apply a pre-load to the seal element 834 and can allow the seal element 834 to expand and contract responsive to temperature changes. As an example, the seal element 834 may thermally expand and maintain a load applied by the biasing mechanism 835. As an example, the seal element 834 and the biasing mechanism 835 can form a seal mechanism. As an example, a seal mechanism may include one or more additional and/or alternative components, such as, for example, a chevron, a packer, a POLYPAK™ element, a key, etc.

In the assembly 800 of FIG. 8, the pressure compensation mechanism 840 includes the movable component 842 that can translate axially in an annular space where dielectric material (M1) is to one side of the movable component 842 and where "heavy" material (M3) and/or well fluid (M4) is to the other side of the movable component 842. As an example, the heavy material (M3) may be or include grease that has a specific gravity that exceeds that of an expected well fluid (M4). In such an example, where the assembly 800 is in the second orientation 802, due to gravity, the heavy material (M3) may be retained in at least a portion of the annular space in which the movable component 842 resides. The presence of the heavy material (M3) can help to lubricate and seal the movable component 842 in the annular space and resist intrusion of well fluid (M4). As an example, where debris may enter the annular space, the heavy fluid (M3) may encapsulate the debris and viscously damp its ability to move, to apply force to a surface that defines in part the annular space, etc. In the example of FIG. 8, the movable component 842 is illustrated as including a plurality of seal elements (e.g., at least an inner element and at least an outer element), which may be or include one or more elastomers. As an example, the movable component 842 may be defined to have a friction force with respect to surfaces that define the annular space. In such an example, a predetermined pressure force (e.g., a predetermined pressure differential) may be, for example, of the order of tens of pounds per square inch (e.g., a hundred kPa or more).

As shown in FIG. 8, the individual conductors 808-1, 808-2 and 808-3 pass through at least a portion of the dielectric material space 860, which may be defined at least in part by surfaces of the boot components 862 and 872. In the example of FIG. 8, the boot components 862 and 872 include a plurality of sleeve portions with openings through which the respective individual conductors 808-1, 808-2 and 808-3 may pass, for example, such that the individual conductors 808-1, 808-2 and 808-3 can be terminated by connectors (see, e.g., the electrical connector sub-assembly 470 of FIG. 5). Dielectric material (M1) in the dielectric material space 860 can help to insulate the individual conductors 808-1, 808-2 and 808-3. Where the dielectric material (M1) is viscous and/or in a gel state, the dielectric material (M1) may help to maintain separation between outer surfaces of the individual conductors 808-1, 808-2 and 808-3, which can include their own one or more layers of insulating material. The dielectric material (M1) may act as a barrier to well fluid (M4) that may intrude into the dielectric material space 860. Where pressure is a driving force for such intrusion, the pressure compensation mechanism 840 may act to reduce the driving force and thereby reduce risk of well fluid intrusion into the dielectric material space 860, which may include a dielectric material chamber and a network of passages that are in fluid communication with the dielectric material chamber. As an example, a pressure compensation mechanism may act to delay intrusion of well fluid in a manner that acts to extend lifetime of a power cable termination assembly.

As an example, a power cable termination assembly can include a cable end; a connector end; a longitudinal axis that extends between the cable end and the connector end; a cable securing mechanism (see, e.g., the cable securing mechanism 850); a dielectric material space (see, e.g., the dielectric material space 860) that includes a volume where the dielectric material space is disposed axially at least in part between the cable securing mechanism and the connector end; and a movable component (see, e.g., the movable component 842) that moves responsive to a pressure differential where movement of the movable component alters the volume of the dielectric material space.

Figure 9:
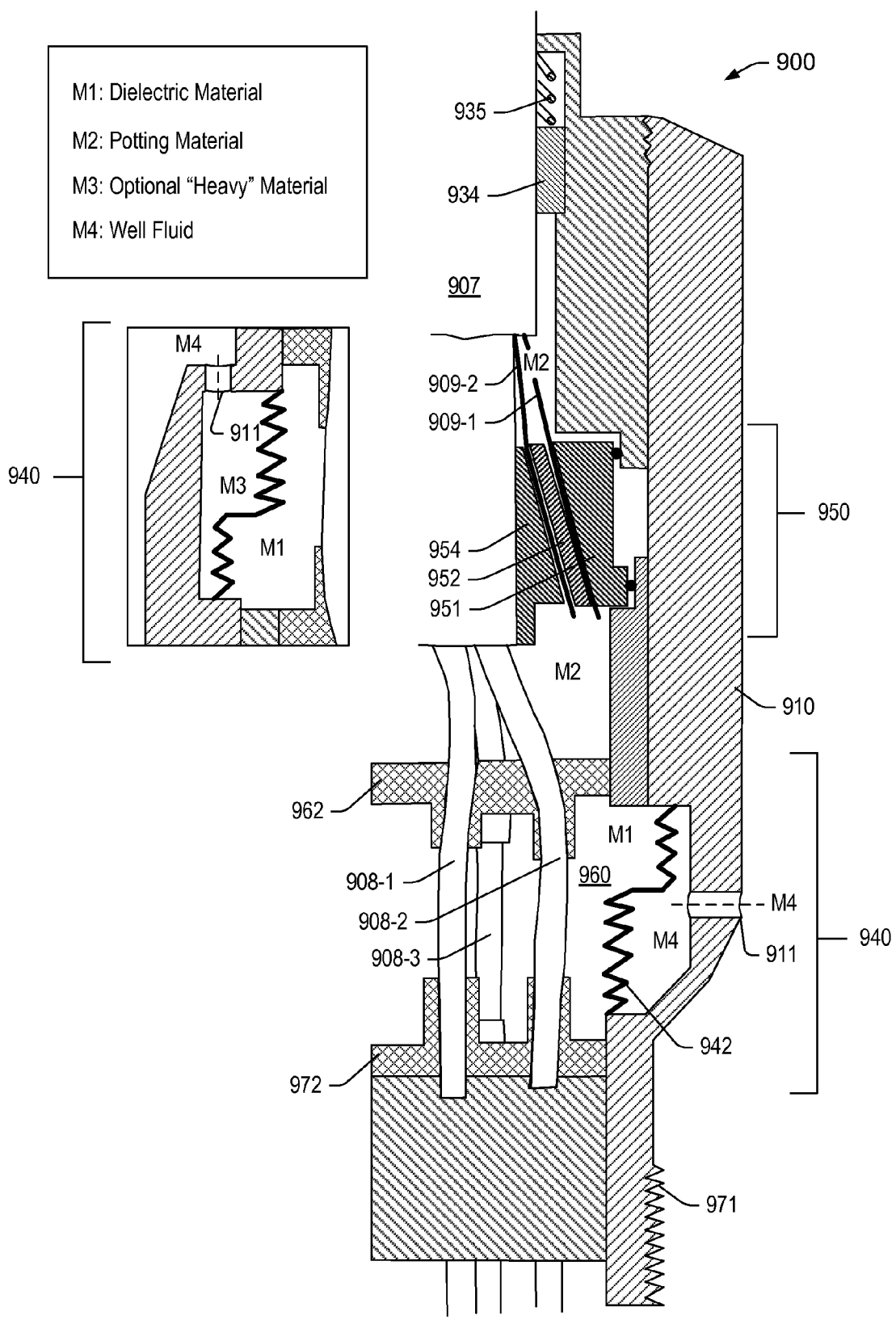
FIG. 9 illustrates an example of a portion of a power cable termination assembly.

FIG. 9 shows a portion of an example of an assembly 900, which may be, for example, oriented in a first orientation with respect to gravity or in a second orientation with respect to gravity; noting that the assembly 900 may optionally be oriented at an angle with respect to gravity. As shown, the assembly 900 includes a pressure compensation mechanism 940, a securing mechanism 950 and a dielectric fluid space 960.

In the example of FIG. 9, the assembly 900 may include various materials such as, for example, a dielectric material (M1), a potting material (M2), and optionally a high specific gravity material (M3). The assembly 900 may be in contact with fluid such as well fluid (M4). Well fluid (M4) may enter the assembly 900 or otherwise interact with the assembly 900 such that the pressure compensation mechanism 940 may act to balance one or more internal pressures with an external pressure (e.g., pressure of the well fluid (M4)).

Also shown in FIG. 9 is a portion of a power cable 907 that includes conductors 908-1, 908-2 and 908-3, which can be insulated conductors. As an example, the power cable 907 may be suitable for delivery of power to a multiphase electric motor via a plurality of conductors. As to strength (e.g., to support an ESP, weight of the cable, etc.), the power cable 907 can include strands 909-1 and 909-2, which may be armor strands that are wound about a core of the power cable where the conductors 908-1, 908-2 and 908-3 are disposed within the core. In the example of FIG. 9, the strands 909-1 and 909-2 may be a first set of strands and a second set of strands. During assembly, these strands may be separated and pulled away from the core of the power cable 907 and secured via the securing mechanism 950, which may be, for example, a rope socket that includes rope socket components 951, 952 and 954. In the example of FIG. 9, potting material (M2) may be included to pot axial ends of at least one or more of the components 951, 952 and 954 with the strands 909-1 and 909-2 secured thereby.

As an example, the securing mechanism 950 (see, e.g., the component 951) may be sealed via one or more seal elements or otherwise separated from (e.g., via one or more barriers) the dielectric material space 960 (see, e.g., spaces labeled dielectric material (M1)). The potting material (M2) may perform various functions and the dielectric material (M1) may perform various functions. The potting material (M2) may be substantially solid (e.g., a hard material), for example, achieved via setting and/or curing of a base or base materials (e.g., epoxy mix, polymerizable material, etc.). The dielectric material (M1) may optionally be in a gel state, which may, for example, expand and/or contract in response to changes in temperature. As an example, consider dielectric material that includes silicone. As an example, a dielectric material may be formed of base materials that are combined (e.g., mixed, etc.). As an example, a dielectric strength of a dielectric material may be of the order of about ten or more kV per mm (e.g., of the order of about hundreds of volts per mil).

In the example of FIG. 9, the assembly 900 includes a housing 910, which may be a multi-piece housing. The housing 910 may include threads 971 such that, for example, the housing 910 can be received by a threaded receptacle of a hanger assembly. In such an example, the assembly 900 may extend downwardly from the hanger assembly and be in contact with fluid such as, for example, well fluid. While threads are mentioned, a connection mechanism may include threads or other types of features to connect components (e.g., bayonet, etc.). As an example, a power cable termination assembly may be operatively coupled to an end of an electric submersible pump to power at least one electric motor of the electric submersible pump.

As shown in FIG. 9, the housing 910 houses a boot with components 962 and 972 that can define in part the dielectric material space 960. The housing 910 also houses a seal element 934 that is biased by a biasing mechanism 935 (e.g., a spring, etc.), a movable component 942 (e.g., a bellows) and rope socket components 951, 952 and 954 of the securing mechanism 950 where the rope socket components 951, 952 and 954 can secure strands of a cable (e.g., armor wire strands). For example, a first set of strands may be received between the components 951 and 952 and a second set of strands may be received between the components 952 and 954.

As an example, a cable received in the housing 910 may be potted using a potting material (M2). As shown in the example of FIG. 9, potting material (M2) can be disposed at least in part in spaces axially above and below the rope socket components 951, 952 and 954.

In the example of FIG. 9, the housing 910 includes a port 911 that is in fluid communication with a space internal to the housing 910 and adjacent to an outer surface of the movable component 942. In such an example, the movable component 942 may be a barrier that physically separates dielectric material (M1) from well fluid (M4), which may enter via the port 911. As an example, the movable component 942 may be a bellows constructed from a material that can withstand physical properties of well fluid (M4). As an example, a bellows may be constructed from a metal, an alloy, a composite material, etc. As an example, a bellows may be constructed from a material that is surface treated to withstand well fluid (M4).

In the example of FIG. 9, the movable component 942 may move in a manner that changes the volume of a space interior to the movable component and that changes the volume of a space exterior to the movable component. For example, where pressure of fluid at the port 911 increases with respect to pressure of dielectric material (M1), the movable component 942 may expand along a first portion of a bellows wall disposed at a first diameter and contract along a second portion of a bellows wall disposed at a second diameter where the first diameter is less than the second diameter.

As shown in FIG. 9, the individual conductors 908-1, 908-2 and 908-3 pass through at least a portion of the dielectric material space 960, which may be defined at least in part by surfaces of the boot components 962 and 972. In the example of FIG. 9, the boot components 962 and 972 include a plurality of sleeve portions with openings through which the respective individual conductors 908-1, 908-2 and 908-3 may pass, for example, such that the individual conductors 908-1, 908-2 and 908-3 can be terminated by connectors (see, e.g., the electrical connector sub-assembly 470 of FIG. 5). Dielectric material (M1) in the dielectric material space 960 can help to insulate the individual conductors 908-1, 908-2 and 908-3. Where the dielectric material (M1) is viscous and/or in a gel state, the dielectric material (M1) may help to maintain separation between outer surfaces of the individual conductors 908-1, 908-2 and 908-3, which can include their own one or more layers of insulating material. The dielectric material (M1) may act as a barrier to well fluid (M4) that may intrude into the dielectric material space 960. Where pressure is a driving force for such intrusion, the pressure compensation mechanism 940 may act to reduce the driving force and thereby reduce risk of well fluid intrusion into the dielectric material space 960, which may include at least a dielectric material chamber (e.g., defined in part by the movable component 942 and in part by the boot components 962 and 972). As an example, a pressure compensation mechanism may act to delay intrusion of well fluid in a manner that acts to extend lifetime of a power cable termination assembly.

As an example, the port 911 may be located at a different location, as illustrated in an inset diagram. In such an example, the port 911 may be facing upwardly with respect to gravity such that a heavy material (M3) may be retained within an interior space of the housing 910 where the heavy material (M3) may be in pressure communication with well fluid (M4). For example, where the heavy material (M3) has a higher specific gravity than the well fluid (M4), the heavy material (M3) may be retained in a space adjacent to the movable component 942. In such an example, the heavy material (M3) may be grease that can act to coat, lubricate and protect the movable component 942.

As an example, an assembly can include one or more metal-to-metal seals (e.g., consider alloy-to-alloy, metal-to-alloy, etc.). As an example, a bellows may be a movable component of a pressure compensation mechanism where the bellows is constructed of metal (e.g., or alloy).

As an example, a power cable termination assembly can include a cable end; a connector end; a longitudinal axis that extends between the cable end and the connector end; a cable securing mechanism (see, e.g., the cable securing mechanism 950); a dielectric material space (see, e.g., the dielectric material space 960) that includes a volume where the dielectric material space is disposed axially at least in part between the cable securing mechanism and the connector end; and a movable component (see, e.g., the movable component 942) that moves responsive to a pressure differential where movement of the movable component alters the volume of the dielectric material space.

Figure 10:
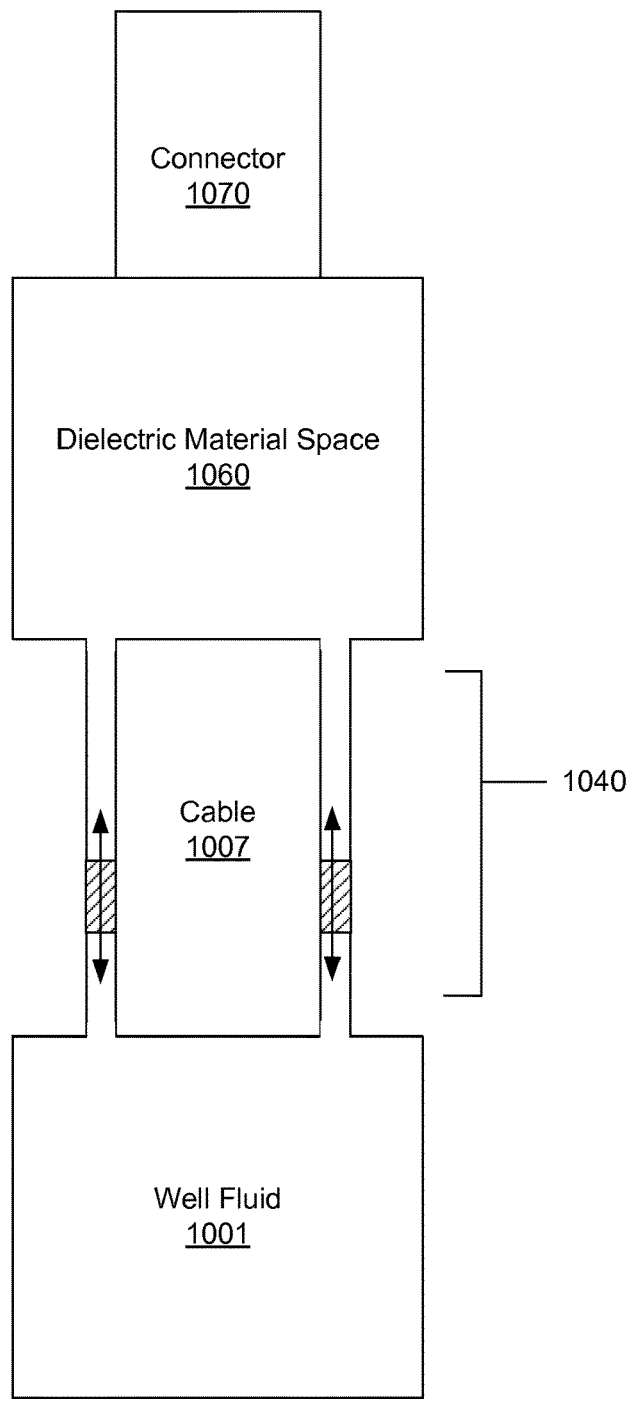
FIG. 10 illustrates an example of a system.

FIG. 10 shows an example of a block diagram of a system 1000 that includes well fluid 1001, a cable 1007, a pressure compensation mechanism 1040, a dielectric material space 1060 and a connector 1070. As shown, the pressure compensation mechanism 1040 can compensate for pressure changes that may occur for dielectric material in the dielectric material space 1060 and the well fluid 1001, which may be transmitted in a space that is external to an outer surface of the cable 1007.

Figure 11:
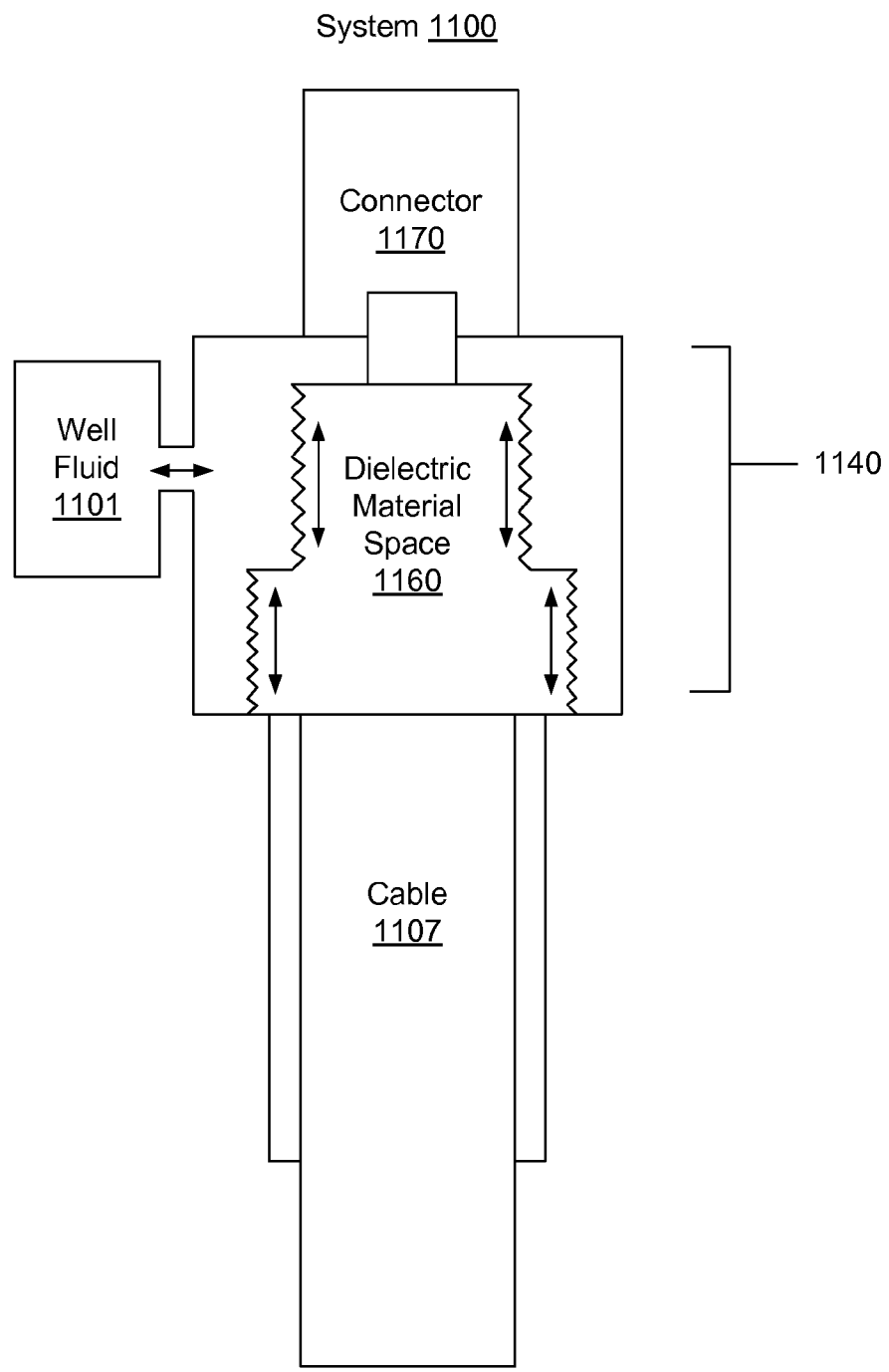
FIG. 11 illustrates an example of a system.

FIG. 11 shows an example of a block diagram of a system 1100 that includes well fluid 1101, a cable 1107, a pressure compensation mechanism 1140, a dielectric material space 1160 and a connector 1170. As shown, the pressure compensation mechanism 1140 can compensate for pressure changes that may occur for dielectric material in the dielectric material space 1160 and the well fluid 1101, which may be transmitted via a port or ports.

As an example, an assembly can include potting material and dielectric material where the potting material is disposed about a portion of the insulated conductors and where the dielectric material is disposed about another portion of the insulated conductors where the conductors terminate and are electrically connected to connectors. In such an example, the assembly can include a pressure compensating mechanism that can act to balance internal pressure associated with the dielectric material and external pressure associated with fluid external to the assembly (e.g., fluid in a downhole environment such as well fluid).

As an example, an assembly can include potting material and dielectric material where the potting material is disposed about and in direct contact with a portion of the insulated conductors and where the dielectric material is disposed about and in direct contact with another portion of the insulated conductors where the conductors terminate and are electrically connected to connectors. In such an example, the assembly can include a pressure compensating mechanism that can act to balance internal pressure associated with the dielectric material and external pressure associated with fluid external to the assembly (e.g., fluid in a downhole environment such as well fluid).

As an example, a pressure compensation mechanism can include one or more of a piston, a bellows, a diaphragm, etc. As an example, a pressure compensation mechanism can include one or more movable components that move responsive to a pressure differential to increase volume of one space and to decrease volume of another space and, for example, vice versa.

Figure 12:
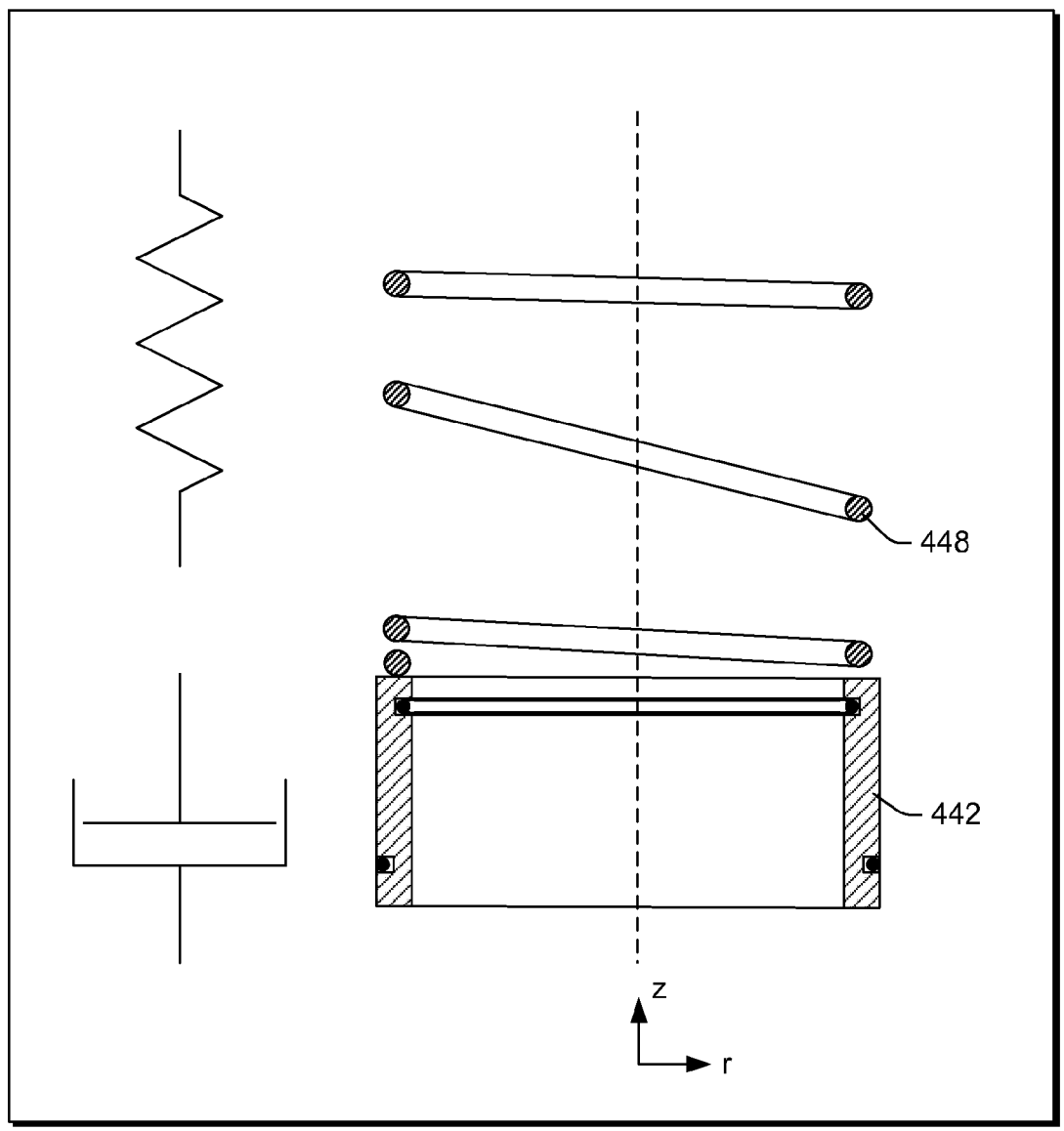
FIG. 12 illustrates an example of components of a pressure compensation mechanism.

FIG. 12 shows the annular piston 442 (e.g., as a cylindrical wall) and the spring 448. As shown, the annular piston 442 may be part of a dashpot mechanism and the spring 448 may be part of a spring mechanism. As mentioned, one or more passages may be dimensions to provide for an amount of viscous damping.

Figure 13:
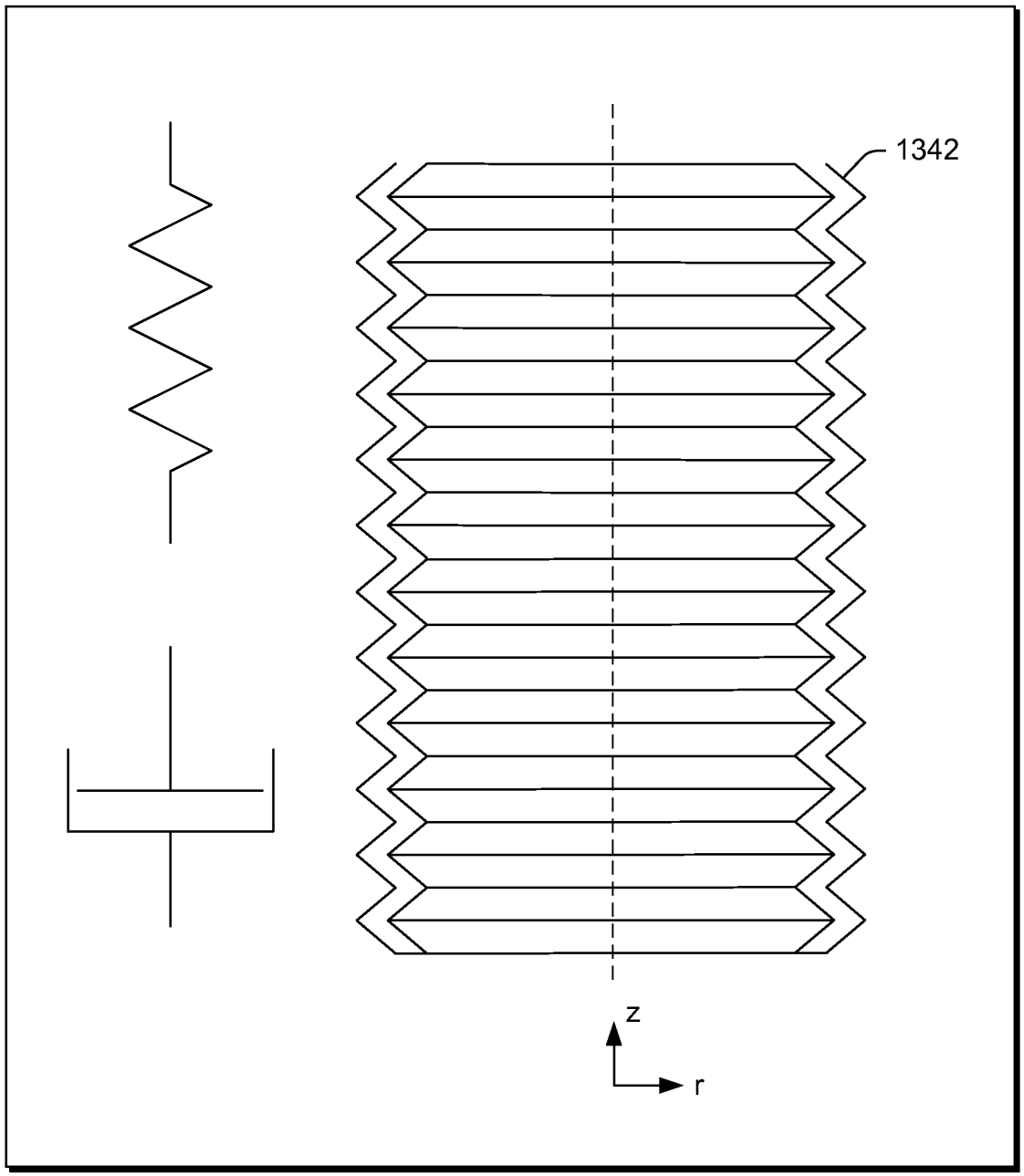
FIG. 13 illustrates an example of components of a pressure compensation mechanism.

FIG. 13 shows an example of a bellows 1342, which may be utilized as at least part of a pressure compensation mechanism. As an example, a bellows may act in part as a spring and may act in part as a dashpot. As an example, the bellows 1342 may be positioned in an annular space that is exterior to an outer surface of a cable (see, e.g., the annular space formed by the components 632 and 636 of FIG. 6). As an example, the bellows 1342 may be positioned to define, at least in part, a dielectric material chamber and/or a dielectric material network that is in fluid communication with a dielectric material chamber. As an example, the bellows 1342 may be positioned such that the interior can fill with well fluid and such that the bellows 1342 can expand and contract to change volume of a space that includes dielectric material. For example, the upper end of the bellows 1342 may be in fluid communication with a port (e.g., sealing the port) such that pressure of fluid communicable via the port can cause the bellows 1342 to expand and contract and thereby change the volume of a space that include dielectric material.

Figure 14:
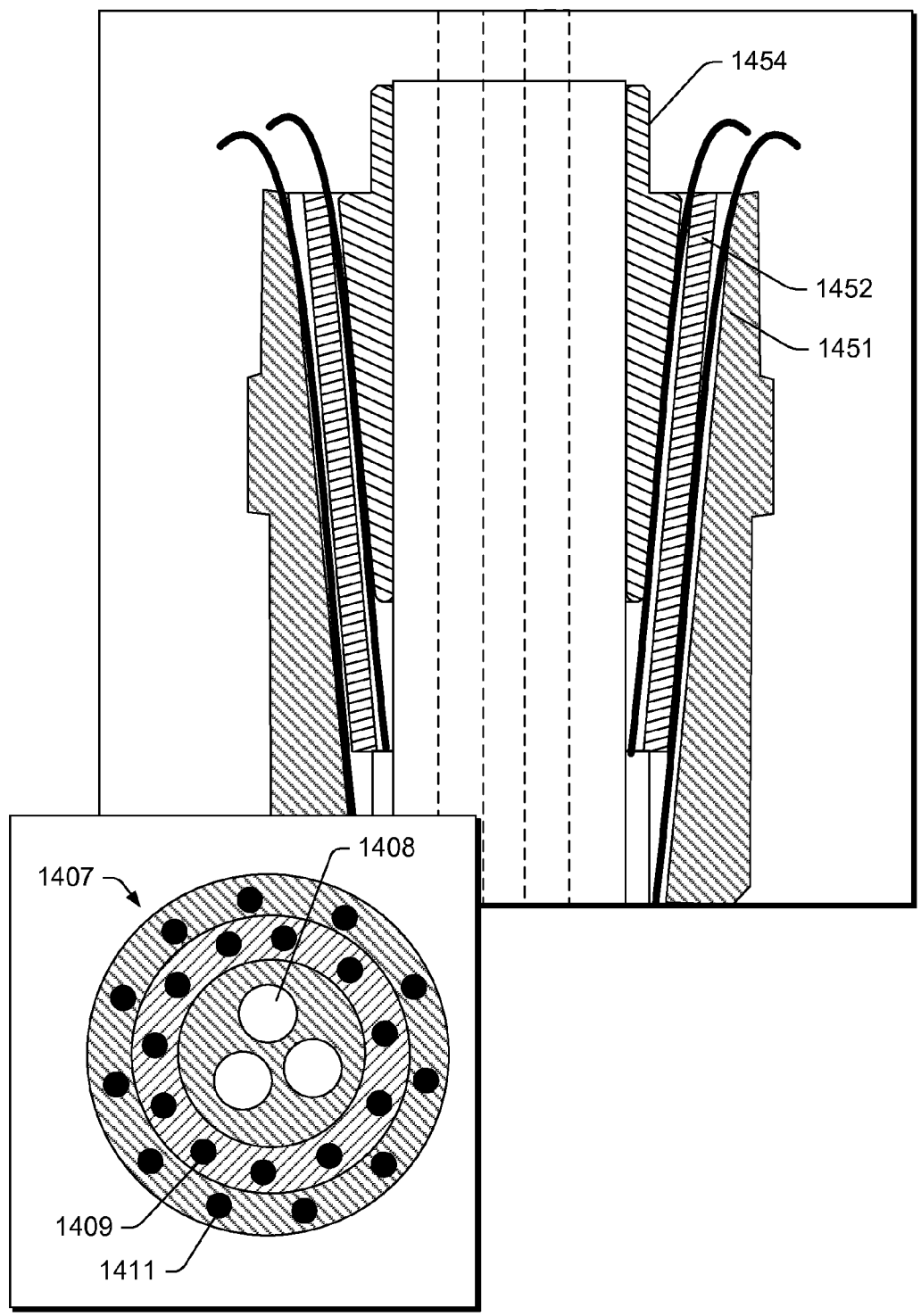
FIG. 14 illustrates an example of a portion of an assembly.

FIG. 14 shows an example of a scenario that includes rope socket components 1451, 1452, 1454 as well as a cable 1407 that includes conductors 1408 and strands 1409 and 1411, which may be made of metal, alloy, etc. As illustrated in FIG. 14, the strands 1409 may be separated in part from the cable 1407 and disposed between conical surfaces of the rope socket components 1452 and 1454 and the strands 1411 may be separated in part from the cable 1407 and disposed between conical surfaces of the rope socket components 1451 and 1452. As an example, in an assembly potting material may be introduced to pot the cable 1407 with respect to one or more portions of the rope socket components 1451, 1452 and 1454.

Figure 15:
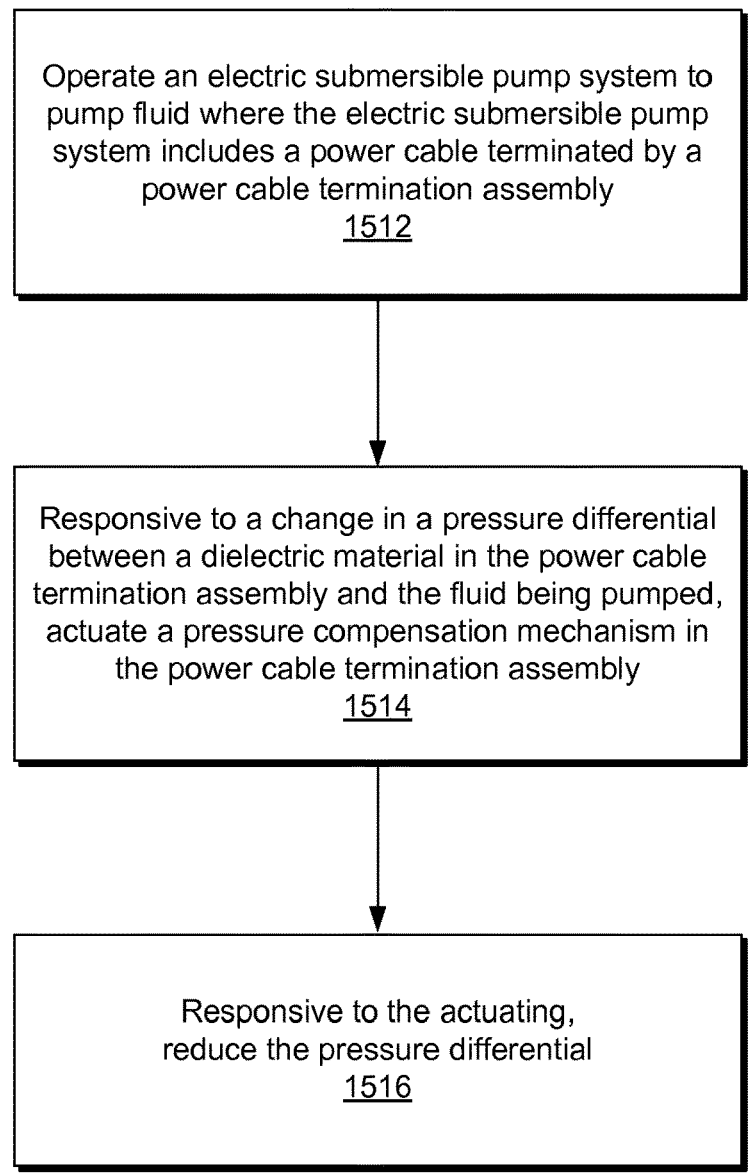
FIG. 15 illustrates an example of a method.

FIG. 15 shows an example of a method 1510 that includes an operation block 1512 for operating an electric submersible pump system to pump fluid where the electric submersible pump system includes a power cable terminated by a power cable termination assembly; an actuation block 1514 for, responsive to a change in a pressure differential between a dielectric material in the power cable termination assembly and the fluid being pumped, actuating a pressure compensation mechanism in the power cable termination assembly; and a reduction block 1516 for, responsive to the actuating, reducing the pressure differential.

As an example, a power cable termination assembly can include a cable end; a connector end; a longitudinal axis that extends between the cable end and the connector end; a cable securing mechanism; a dielectric material space that includes a volume where the dielectric material space is disposed axially at least in part between the cable securing mechanism and the connector end; and a movable component that moves responsive to a pressure differential where movement of the movable component alters the volume of the dielectric material space. In such an example, the movable component may be an annular piston or, for example, a bellows.

As an example, a dielectric material space can be or include a dielectric material chamber. As an example, a dielectric material space can include a dielectric material network that is in fluid communication with a dielectric material chamber. As an example, movement of a movable component can alter the volume of a dielectric material chamber. As an example, movement of a movable component can alter the volume of a dielectric material network.

As an example, a power cable termination assembly can include a cable received by a cable end and secured by a securing mechanism. In such an example, the cable can include insulated conductors and the assembly can include a boot that defines, at least in part, the dielectric material space and where the insulated conductors are received by the boot. As an example, a boot may include a lower portion and an upper portion.

As an example, a power cable termination assembly can include potting material that contacts a cable and that contacts a securing mechanism. As an example, potting material may include one or more polymeric materials. As an example, potting material may be a composite material. As an example, potting material may be processed from a molten and/or liquid state to a solid state (e.g., consider hardening of an epoxy, etc.).

As an example, insulated conductors can include insulation and electrical conductors where the electrical conductors can be conductively coupled to respective connectors at a connector end of a power cable termination assembly. In such an example, at least the electrical conductors can pass through a dielectric material space of the power cable termination assembly where dielectric material is disposed in the dielectric material space.

As an example, a cable termination assembly can include grease, for example, where the grease is disposed at least in part adjacent to a movable component. As an example, such grease may be selected based at least in part on specific gravity and, for example, orientation of the cable termination assembly with respect to gravity. For example, grease may be retained in a space within the cable termination assembly at least in part due to gravity where its specific gravity may be sufficiently high to reduce risk of displacement of the grease by fluid such as well fluid. As an example, grease may act to protect a movable component from a fluid such as well fluid.

As an example, a power cable termination assembly can include a securing mechanism that includes rope socket components. Such an assembly may include a cable that includes strands received by the rope socket components. In such an example, the assembly can include potting material that directly contacts the strands and the rope socket components.

As an example, a method can include operating an electric submersible pump system to pump fluid where the electric submersible pump system includes a power cable terminated by a power cable termination assembly; responsive to a change in a pressure differential between a dielectric material in the power cable termination assembly and the fluid being pumped, actuating a pressure compensation mechanism in the power cable termination assembly; and, responsive to the actuating, reducing the pressure differential. In such an example, the actuating can include translating an annular piston in an annular space that is exterior to an outer surface of the power cable. As an example, actuating can include altering the length of a bellows or at least a portion of a bellows. In such an example, a bellows may be in an annular space that is exterior to an outer surface of the power cable or, for example, in another space (e.g., consider in a space that includes or is adjacent to a dielectric material chamber, etc.).

As an example, a method can include supplying power to an electric motor of an electric submersible pump system via a cable. As an example, a method can include suspending an electric submersible pump of an electric submersible pump system via a power cable termination assembly (e.g., and at least one cable).

As an example, a system can include a first power cable termination assembly; a second power cable termination assembly; a power cable operatively coupled to the first power cable termination assembly and to the second power cable termination assembly; and an electric submersible pump operatively coupled to the second power cable termination assembly where at least one of the first power cable termination assembly and the second power cable termination assembly includes a pressure compensation mechanism that includes a component that is movable where movement of the component alters volume of a dielectric material space in the at least one power cable termination assembly. In such an example, the component can move responsive to a pressure differential between a pressure of dielectric material in the dielectric material space and a pressure external to the at least one power cable termination assembly. In such an example, friction and/or other force may resist movement. As an example, a pressure compensation mechanism may be configured to move at a specified minimum pressure differential. As an example, such a specified minimum pressure differential may be stated in pounds per square inch, pascals or other units.

As an example, a compensation mechanism can include a component movable in a space disposed directly radially exteriorly to an outer surface of a power cable (e.g., within a power cable termination assembly) where movement of the component alters volume of a dielectric material network in the power cable termination assembly.

As an example, a power cable termination assembly can include a cable end; a connector end; a dielectric material chamber disposed between the cable end and the connector end, the dielectric material chamber in fluid communication with a dielectric material network that extends from the dielectric material chamber toward the cable end; a first component that includes an inner surface; a second component that includes a bore for receipt of a power cable and an outer surface where the inner surface of the first component and the outer surface of the second component form an annular space; and a third component disposed in the annular space where movement of the third component in the annular space alters volume of the dielectric material network. In such an example, the assembly can include an exterior shoulder that seats the power cable termination assembly in a hanger for suspension of at least a power cable. As an example, a power cable termination assembly may include one or more coupling mechanisms such as threads, a bayonet, etc. that can operatively couple the assembly to a hanger.

As an example, a power cable termination assembly can include a cable securing mechanism disposed between a dielectric material chamber and a cable end where the cable securing mechanism may be or include a rope socket.

As an example, a component of a power cable termination assembly may be an annular piston. As an example, a component of a power cable termination assembly may be a bellows. As an example, a component may be biased by a biasing mechanism such as, for example, a spring.

As an example, a dielectric material network may include an annular space that includes, for example, a movable component that may move to alter the volume of the annular space. As an example, a movable component can include a dielectric material end for contacting dielectric material and a well fluid end for contacting well fluid.

As an example, one or more methods described herein may include associated computer-readable storage media (CRM) blocks. Such blocks can include instructions suitable for execution by one or more processors (or cores) to instruct a computing device or system to perform one or more actions. As an example, a computer-readable storage medium may be non-transitory and not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a deployment process of a cable operatively coupled to an electric submersible pump, a repositioning process, a pumping process, a heating process, etc.

Figure 16:
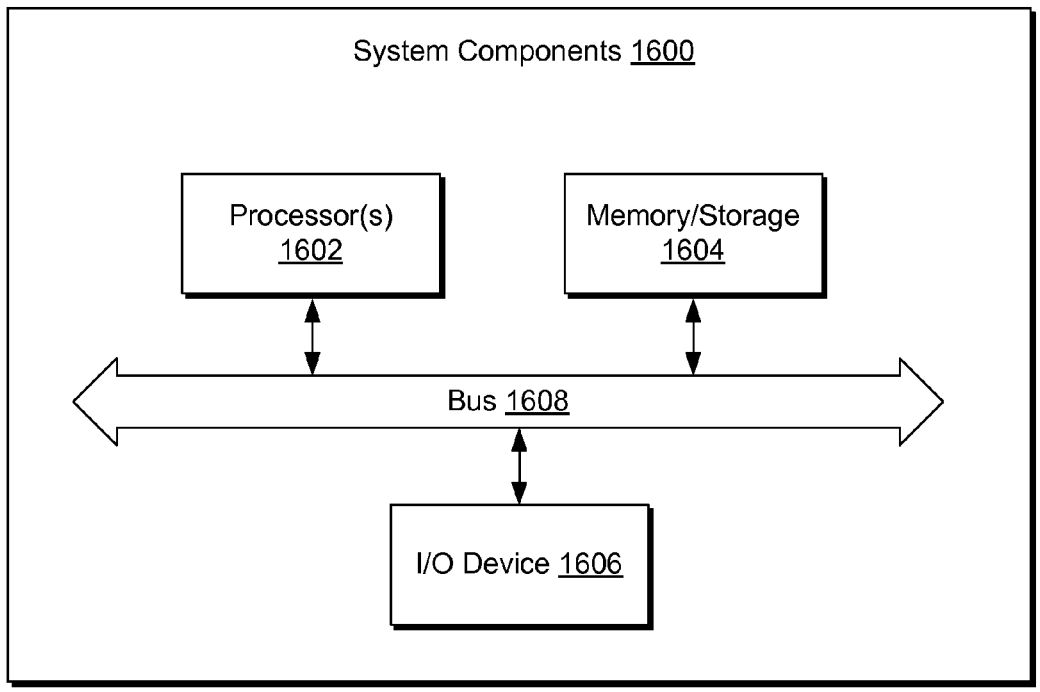
FIG. 16 illustrates example components of a system and a networked system.
Figure 16:
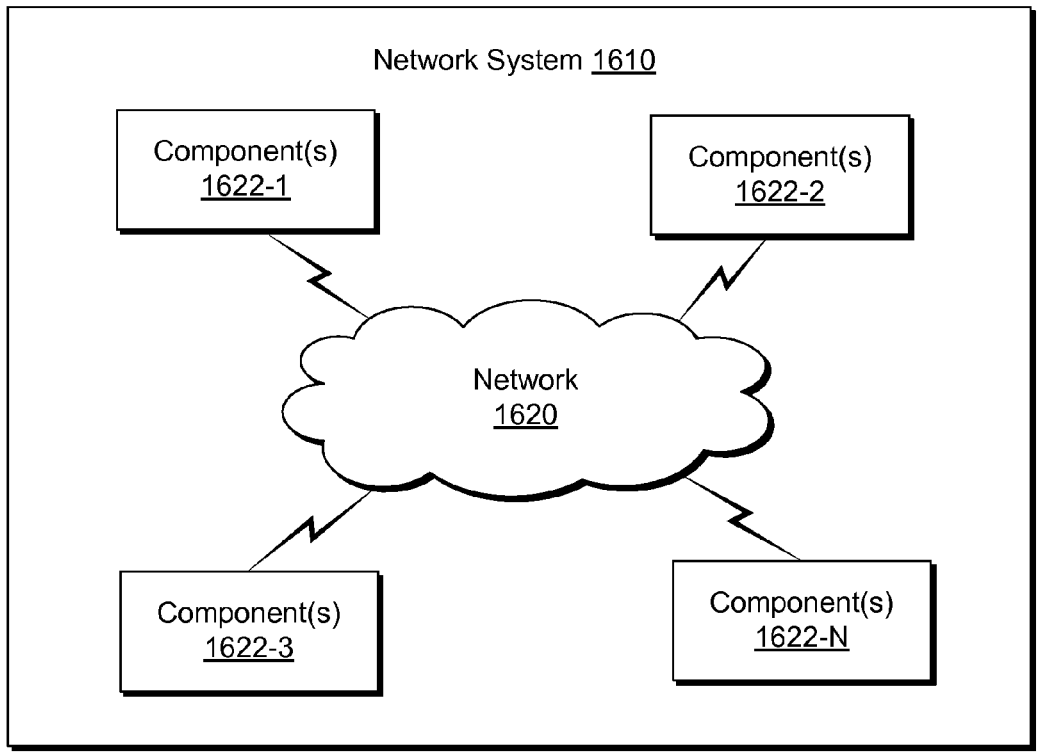

FIG. 16 shows components of a computing system 1600 and a networked system 1610. The system 1600 includes one or more processors 1602, memory and/or storage components 1604, one or more input and/or output devices 1606 and a bus 1608. According to an embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). According to an embodiment, a computer-readable medium may be a storage component such as a physical memory storage device, for example, a chip, a chip on a package, a memory card, etc.

According to an embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method. The network may be or include the Internet, an intranet, a cellular network, a satellite network, etc.

CONCLUSION

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:
1. A power cable termination assembly comprising:
a cable end;
a connector end;
a longitudinal axis that extends between the cable end and the connector end;
a cable securing mechanism having rope socket components positioned to secure strands extending from a cable;
a dielectric material space that comprises a volume wherein the dielectric material space is disposed axially at least in part between the cable securing mechanism and the connector end; and
a pressure compensation mechanism having:
a movable component that moves responsive to a pressure differential between a dielectric material end of the movable component and a well fluid end of the movable component, wherein movement of the movable component alters the volume of the dielectric material space; and
a spring member which resists movement of the movable component when pressure is greater at the well fluid end of the movable component than at the dielectric material end of the movable component.

2. The power cable termination assembly of claim 1 wherein the movable component comprises an annular piston.

3. The power cable termination assembly of claim 1 wherein the movable component comprises a bellows.

4. The power cable termination assembly of claim 1 wherein the dielectric material space comprises a dielectric material chamber.

5. The power cable termination assembly of claim 4 wherein the dielectric material space comprises a dielectric material network that is in fluid communication with the dielectric material chamber.

6. The power cable termination assembly of claim 5 wherein movement of the movable component alters the volume of the dielectric material network.

7. The power cable termination assembly of claim 4 wherein movement of the movable component alters the volume of the dielectric material chamber.

8. The power cable termination assembly of claim 1 further comprising a cable received by the cable end and secured by the securing mechanism.

9. The power cable termination assembly of claim 8 wherein the cable comprises insulated conductors and further comprising a boot that defines, at least in part, the dielectric material space and wherein the insulated conductors are received by the boot.

10. The power cable termination assembly of claim 8 further comprising potting material that contacts the cable and that contacts the securing mechanism.

11. The power cable termination assembly of claim 9 wherein the insulated conductors comprise insulation and electrical conductors wherein the electrical conductors are conductively coupled to respective connectors at the connector end.

12. The power cable termination assembly of claim 11 wherein at least the electrical conductors pass through the dielectric material space and further comprising dielectric material disposed in the dielectric material space.

13. The power cable termination assembly of claim 1 further comprising grease wherein the grease is disposed at least in part adjacent to the movable component.

14. A method comprising:
operating an electric submersible pump system to pump fluid wherein the electric submersible pump system comprises a power cable terminated by a power cable termination assembly;
responsive to a change in a pressure differential between a dielectric material in the power cable termination assembly and the fluid being pumped, actuating a pressure compensation mechanism in the power cable termination assembly, the actuating comprising translating an annular piston in an annular space that is exterior to an outer surface of the power cable;
responsive to the actuating, reducing the pressure differential;
using a spring member to damp movement of the annular piston, wherein the spring member resists movement of the annular piston when pressure of the fluid being pumped increases; and
positioning a potting material within the power cable termination assembly at a location to reduce risk of flow of a flowable material of the power cable.

15. The method of claim 14 wherein the actuating comprises altering the length of a bellows in an annular space that is exterior to an outer surface of the power cable.

16. The method of claim 14 wherein the operating comprises supplying power to an electric motor of the electric submersible pump system via the cable.

17. The method of claim 14 further comprising suspending an electric submersible pump of the electric submersible pump system via the power cable termination assembly.

18. A system comprising:
a first power cable termination assembly;
a second power cable termination assembly;
a power cable operatively coupled to the first power cable termination assembly and to the second power cable termination assembly; and
an electric submersible pump operatively coupled to the second power cable termination assembly wherein at least one of the first power cable termination assembly and the second power cable termination assembly comprises:
a pressure compensation mechanism that comprises a component that is movable, wherein movement of the component alters volume of a dielectric material space in the at least one power cable termination assembly, the component being engaged with a spring member to damp movement of the component, wherein the spring member resists movement of the component when pressure of fluid being pumped by the electric submersible pump increases;
a cable securing mechanism to secure strands coupled to the power cable;
a seal element positioned to apply a force to the power cable; and
a potting material positioned adjacent the seal element to reduce risk of flow of a flowable material of the power cable.

19. The system of claim 18 wherein the component moves responsive to a pressure differential between a pressure of dielectric material in the dielectric material space and a pressure external to the at least one power cable termination assembly.

* * * * *